(12) United States Patent
Warren

(10) Patent No.: US 8,391,433 B2
(45) Date of Patent: Mar. 5, 2013

(54) FLOW CONTROLLED PULSED SERIAL LINK

(75) Inventor: Robert G. Warren, Bristol (GB)

(73) Assignee: STMicroelectronics (Research & Development) Limited, Marlow (GB)

(*) Notice: Subject to any disclaimer, the term of this patent is extended or adjusted under 35 U.S.C. 154(b) by 653 days.

(21) Appl. No.: 11/885,130

(22) PCT Filed: Feb. 8, 2006

(86) PCT No.: PCT/GB2006/000430
§ 371 (c)(1),
(2), (4) Date: Nov. 21, 2008

(87) PCT Pub. No.: WO2006/090109
PCT Pub. Date: Aug. 31, 2006

(65) Prior Publication Data
US 2009/0141789 A1    Jun. 4, 2009

(30) Foreign Application Priority Data

Feb. 28, 2005 (EP) .................... 05251188

(51) Int. Cl.
*H04L 7/00* (2006.01)
(52) U.S. Cl. .................. 375/354; 375/259; 375/238
(58) Field of Classification Search .................. 375/259, 375/354, 238
See application file for complete search history.

(56) References Cited

U.S. PATENT DOCUMENTS

| 4,459,591 A | 7/1984 | Haubner et al. |
| 5,604,918 A | 2/1997 | Huijsing et al. |

FOREIGN PATENT DOCUMENTS

| EP | 0 851 623 A | 7/1998 |
| WO | WO2004/066576 | 8/2004 |

OTHER PUBLICATIONS

International Preliminary Report on Patentability Chapter I, PCT/GB06/00430, Nov. 9, 2007.*

* cited by examiner

*Primary Examiner* — Shuwang Liu
*Assistant Examiner* — Nader Bolourchi

(57) ABSTRACT

Apparatus for transmitting a clock and data from a first module to a second module connected by a single outward line and a single return line, comprising: means for transmitting a data pulse on the single outward line comprising means for asserting a first edge on said single outward line, said first edge representing a timing edge for the clock and means for asserting a second edge on the single outward line a selectable time period after said first edge, said selectable time period representing said data; and means for receiving a return pulse on said single return path comprising means for receiving a first edge and a second edge on the single return line, the first and second edges being separated by a first time period, said first time period representing an acknowledgement.

21 Claims, 11 Drawing Sheets

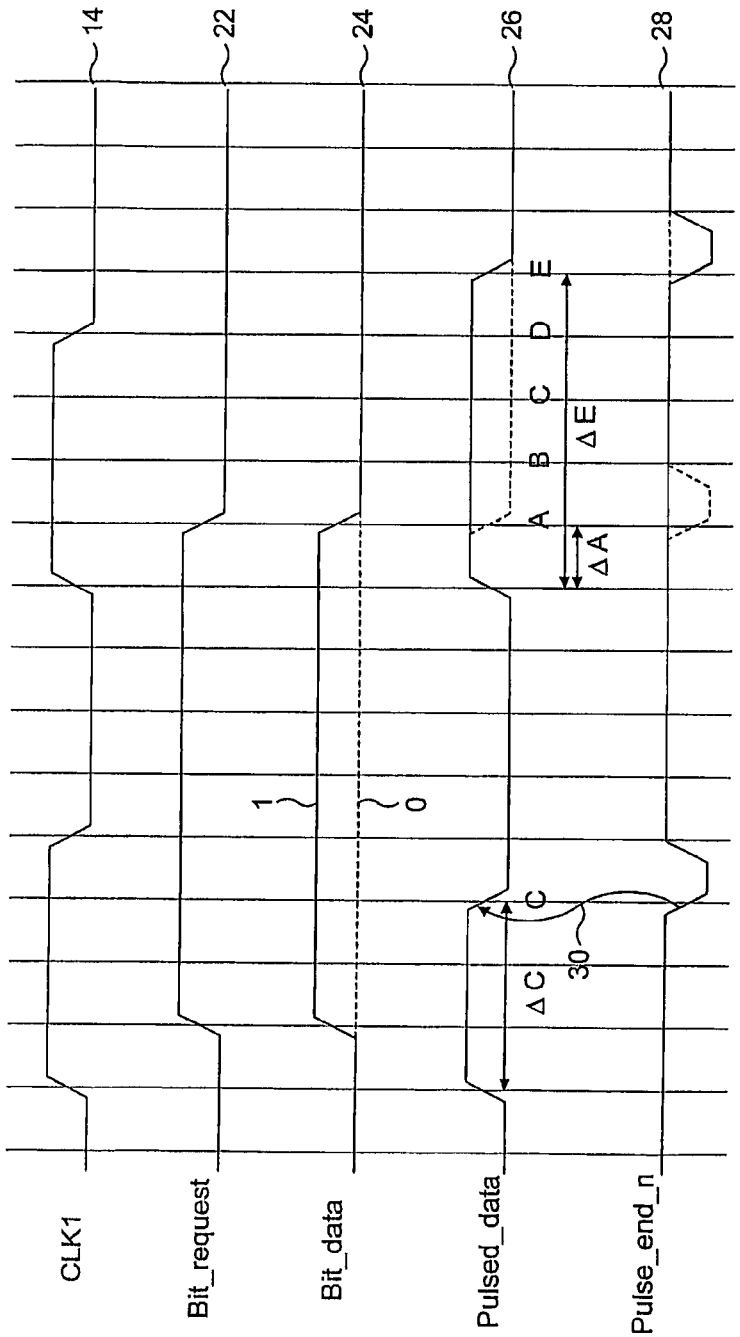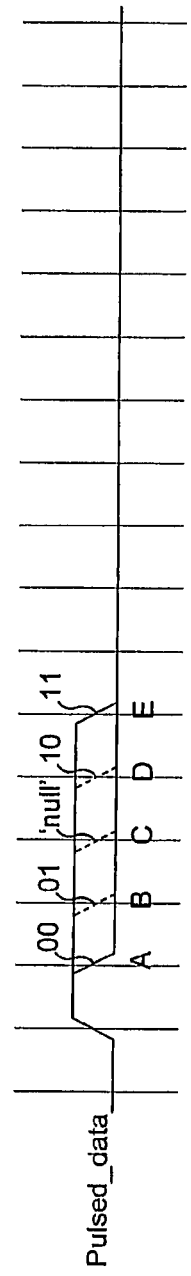

ENCODER CIRCUITRY

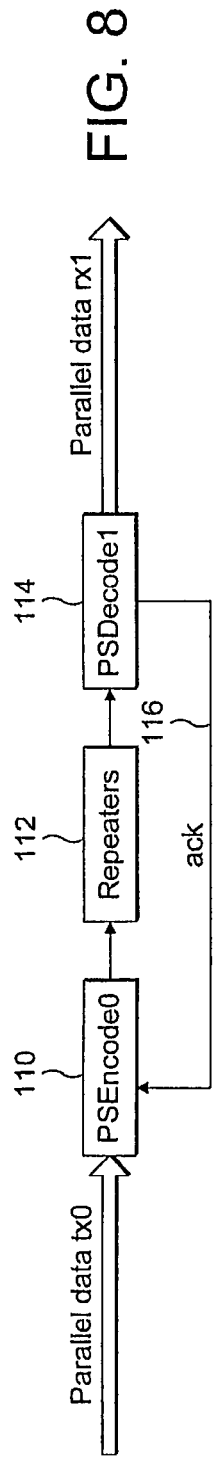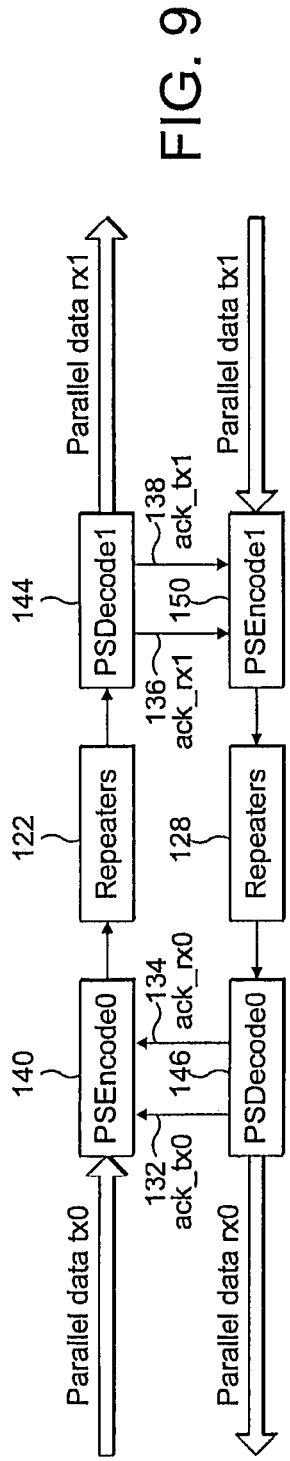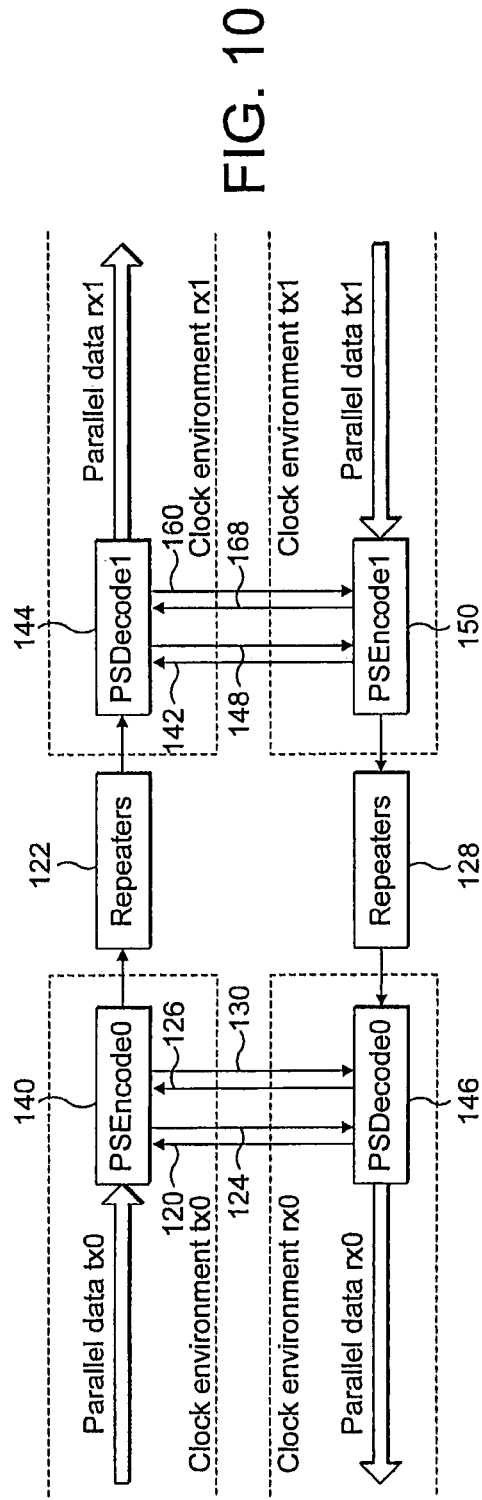

FLOW CONTROLLED PULSED SERIAL LINK

CROSS-REFERENCE TO RELATED APPLICATION(S)

The present application is related to European Patent Application No. 05251188.8 filed Feb. 28, 2005, entitled "FLOW CONTROLLED PULSED SERIAL LINK". European Patent Application No. 05251188.8 is assigned to the assignee of the present application and is hereby incorporated by reference into the present disclosure as if fully set forth herein. The present application hereby claims priority under 35 U.S.C. §119(a) to European Patent Application No. 05251188.8.

The present invention relates to handling information in a number of different environments, and in particular to flow control for communications between modules on an integrated circuit, or between integrated circuits.

Modern integrated circuits (ICs) use timing signals to control sequences of events across a chip, and this is known as synchronous design. A clock signal is sent to each module on a chip, and data signals are sent on separate lines. If a first module sends data to a second module following a clock transition $T_n$, then the second module will capture the data at the next clock transition, $T_{n+1}$. Use of synchronous design is a crucial factor in constraining the complexity of problems in integrated circuit design.

A typical system on a chip (SoC) may have a large number of clocks. All of the logic in all of the modules clocked by a single clock, and all of the logic and data connections between such modules is known as a single clock environment and this conforms to synchronous design. Other design techniques are employed for data signals that cross between logic or modules that are clocked by different clocks.

Whilst synchronous design between modules generally limits IC design problems there are problems with this approach. Firstly, for a synchronous chip to function correctly, a reliable clock signal has to be available across every part of the design. Tracks are generally used to transport the clock signal on a chip. High drive strengths will be required in order to overcome capacitance on these tracks. Lines with high drive strengths risk being cross-talk aggressors, meaning that they interfere with other lines on the chip. The solution is generally to limit the maximum length of any one track, and use repeaters where the track length is longer than this maximum length. However, in order to distribute the clock, there may well not be one long thin track, but a tree branch fan-out to a number of destinations. Driving a lot of circuit track has a number of undesirable effects including inducing cross-talk and transistor lifetime degradation. Furthermore, there are often design problems in driving many buffers to all destinations on a chip.

The problems with synchronous designs may be partially overcome in asynchronous designs, in which modules on a chip may operate at their own independent speeds, and no clock signal is transmitted between modules. However, an entirely asynchronous design is an extremely difficult proposition in practice, due to the uncertainty of when signals in the circuit are valid.

An approach has been proposed which is globally asynchronous, locally synchronous (GALS). This means that the logic in each module on a chip is synchronous, however, the connections between modules are asynchronous. This approach promises to solve timing problems and reduce power consumption, all without designers needing to learn fundamentally new skills or abandoning any of the existing huge investment in predefined, synchronous IP (Intellectual Property) circuit blocks. However, for asynchronous communication between modules on a chip, there are two basic requirements: the receiving unit has to know when to read the data line; and the sending unit has to know when it can send a new value. In synchronous designs these issues are controlled by the system clock, and by knowing the timing characteristics of the link, timing can be controlled such that these requirements are met.

Asynchronous design is significantly more difficult both for manual analysis and to automate because of the computational complexity. In synchronous design, it is only the final, settled output of each logic cone that needs to be analysed in terms of its logic value and timing; that is, what is the longest path that a transition could take to propagate through the logic cone and also what is the shortest path (used to determine how long the result will remain stable after a subsequent clock). This synchronous design analysis only need be performed at two process extremes, the slowest PVT (process, voltage, temperature) for the longest path and the fastest PVT for the shortest path. In synchronous design, it does not matter if the output of any cone of logic changes any number of times or glitches prior to the final settled output time because the resultant data is only captured once coincident with the following clock edge. However, in asynchronous design multiple output changes and glitches need to be avoided and the analysis for such needs to be performed across all variations of input timings and all combinations of timing paths through the logic cone.

Another inherent problem with asynchronous design is the philosophical issue of decision making. At certain points in time, decisions need to be made, such as whether a change in signal A occurred before or after a change in signal B. If the timing of the change in A is close to the timing of the change in B then there is an increased risk of vacillation or dithering (referred to as metastability). In order to ensure correct operation, a large delay (for example tens of times longer than a gate delay), needs to be inserted to reduce the risk to an acceptable level. This same issue occurs for signals crossing between clock environments of synchronous designs and is handled by the insertion of synchronisers incurring a similar delay.

In asynchronous design, with no clock, a different approach must be used. The simplest of these approaches is to use two wires—one for '1's and the other for '0's. When both wires are low, then no data is transmitted and the receiver knows that there is no data value on the wire. When either wire is set to high, the receiver knows that there is data on the wire, and depending on which wire is set to high, the data will be a 0 or a 1.

Another approach is to have one wire designated as a clock or strobe, and the second wire (or collection of wires) carrying the data.

With both of these approaches, the design must be such that changes in either of the two wires are separated in time, or a delay must be inserted to reduce the effects of metastability.

In such systems a third wire is preferably present for an acknowledge signal to the sender, indicating that the receiver has received the data transmission, and priming the sender for another data transmission. This is basic flow control, which in the simplest terms, requires a feedback path from the receiver to the transmitter to acknowledge each data sample transferred.

An extra feedback path between modules on an integrated circuit is undesirable due to the additional resources required.

In known serial communications links, the first bit transmitted is usually used to indicate to the receiving device the start of a data transmission. Generally, the first bit will be a '1', whereas in idle mode only '0's are transmitted. The resources in such a system are wasted as this initial bit never conveys data.

It is an aim of embodiments of the present invention to at least partially address these above problems known in the prior art.

According to a first aspect of the present invention there is provided apparatus for transmitting a clock and data from a first module to a second module connected by a single outward line, and a single return line, comprising means for transmitting a data pulse on the single outward line comprising means for asserting a first edge on said single outward line said first edge representing a timing edge for the clock and means for asserting a second edge on the single outward line a selectable time period after said first edge, said selectable time period representing said data; and means for receiving a return pulse on said single return path comprising means for receiving a first edge and a second edge on the single return line, the first and second edges being separated by a first time period, said first time period representing an acknowledgement.

The acknowledgement recited in any of the embodiments of the invention can indicate that the data pulse has been received by said second module. The acknowledgement can also indicate that a group of said data pulses has been received by said second module, or that an input buffer in the second module is ready to receive more data. In response to the acknowledgement, according to some embodiments, the first module is arranged to transmit a data pulse on the outward line to the second module.

The first and second modules can be on the same integrated circuit.

According to a second aspect of the present invention there is provided apparatus for transmitting first data and a clock from a first module to a second module on a first single line, and for transmitting second data from the second module to the first module on a second single line, the first module comprising means for transmitting a first pulse on the first single line comprising means for asserting a first edge on said first single line, said first edge representing a timing edge for the clock and means for asserting a second edge on the first single line at one of a plurality of selectable time periods after said first edge, said selectable time period representing said first data, the second module comprising means for transmitting a second pulse on the second single line comprising means for asserting a first edge on said second single line and means for asserting a second edge on the second single line at one of a plurality of selectable time periods after said first edge, said selectable time period representing said second data wherein the number of selectable time periods for said second edge on said first single line does not equal the number of selectable time periods for said second edge on said second single line.

According to a further aspect of the present invention there is provided a method of encoding a clock data and an acknowledgement signal onto a single line from a second module to a first module comprising the steps of asserting a first edge on the single line, said first edge representing a timing edge for the clock; and asserting a second edge on the single line at one of at least three selectable time periods after said first edge, first and second of the selectable time periods representing respectively different data values and the third selectable time period representing a data value and an embedded acknowledgement.

According to one embodiment the embedded acknowledgement indicates that at least one data value has been received by the second module from the first module. The embedded acknowledgement can also indicate that said second module is ready to receive data from said first module.

According to an embodiment the data value represented by the first selectable time period is the same value as the data value represented by the third selectable time period. A fourth selectable time period can be provided representing a different data value and an acknowledgement. According to one embodiment a further selectable time period represents an idle state in which no data and no acknowledgement is communicated.

According to another aspect of the present invention there is provided a method of communicating between two modules on a single line comprising the steps of transmitting a first pulse on the single line comprising the steps of asserting a first edge of the single line, said first edge representing a timing edge for the clock; and asserting a second edge on the single line at one of a plurality of selectable time periods after said first edge, a first selectable time period representing a flow control value for controlling the flow of data between said modules.

The flow control value is used to control the flow of data by indicating that more data or no more data may be transmitted between the modules, and/or indicating that data is valid, or has been correctly received by one of the modules.

According to one embodiment a second selectable time period indicates that a subsequent pulse transmitted on said single line represents data. A third selectable time period can represent an idle state in which no data and no acknowledgement is communicated.

According to yet another aspect of the present invention there is provided a method of conveying a clock and information between two modules on a single line comprising the step of transmitting a first pulse and a subsequent pulse on said line, each pulse having a pulse width and being transmitted by asserting a first edge, said first edge representing a timing edge for the clock and a second edge on the single line separated by a selectable time period thereby providing a plurality of different pulse widths, wherein the significance of the pulse width used for said first pulse depends on the pulse width of the subsequent pulse. The subsequent pulse is the pulse immediately following the first pulse.

The significance of the pulse width of the first pulse and the subsequent pulse can further depend on the pulse width of a further subsequent pulse. In one embodiment there are a pair of first pulses and a pair of subsequent pulses, the significance of the pulse widths used for the first pair being dependent on the pulse widths of the subsequent pair.

The significance of the pulse width of the first pulse width can be one of an acknowledgement, control data and a data sample. The significance of the first pulse is preferably determined by whether or not the subsequent pulse represents an idle state.

According to another aspect of the present invention there is provided a method of conveying a clock and information between two modules on a single line comprising the step of transmitting a first pulse on said line, said first pulse having a pulse width and being transmitted by asserting a first edge, said first edge representing a timing edge for the clock and a second edge on the single line separated by a selectable time period thereby providing a plurality of different pulse widths, wherein one of the plurality of pulse widths indicates that a subsequent pulse represents data.

According to one embodiment the one of the plurality of pulse widths further represents an embedded acknowledgement, and according to another embodiment could also indicate that a following group of pulses represent data.

According to a further aspect of the present invention there is provided a method of conveying a clock and information between two modules on a single line comprising the step of transmitting a first pulse and a subsequent pulse on said line, each pulse having a pulse width and being transmitted by asserting a first edge, said first edge representing a timing edge for the clock and a second edge on the single line separated by a selectable time period thereby providing a plurality of different pulse widths, wherein the pulse width of the first pulse indicates that the pulse width of the subsequent pulse needs to be taken into account in order to determine the nature of information conveyed by pulse widths of other pulses.

The other pulses are preferably subsequent pulses. The nature of information can be one of control information and an acknowledgement signal. The subsequent pulse can comprise an embedded acknowledgement.

According to one embodiment there are at least four different selectable pulse widths.

According to one embodiment of the invention a first pulse conveys any one of "idle", "acknowledge", "start (data to follow)" or a combined "acknowledge" and "start (data to follow)". A second pulse can also be provided which is a modifier to distinguish types of data between control information, regular data, or other reserved functionality, and an optional further eight or other predetermined number of pulses to convey the actual data or control information.

According to any of the above described embodiments the first edge is preferably a rising edge and the second edge is a falling edge. Further more the second edge is preferably the subsequent edge after the first edge. Preferably the first edge of said first pulse represents a timing edge, in particular, when a clock is to be encoded on a single line with the data.

For a better understanding of the present invention and to show how the same may be carried into effect, embodiments of the invention will now be described by way of example with reference to the accompanying drawings, in which:

FIG. 2 shows data and timing signals encoded according to one example of a pulsed serial link according to one embodiment;

FIG. 2A shows the pulsed_data signal in another example of a pulsed serial link according to another embodiment;

FIG. 8 shows a communications link with acknowledgement return path;

FIG. 9 shows a communications link with encoded acknowledgement signals according to an embodiment of the present invention;

FIG. 10 shows a communications link using a valid-ack protocol according to another embodiment of the present invention;

A method and apparatus for flow control between communicating modules will be described in relation to a pulsed serial link, however such principles may be applied to any communications link.

Figure 1:
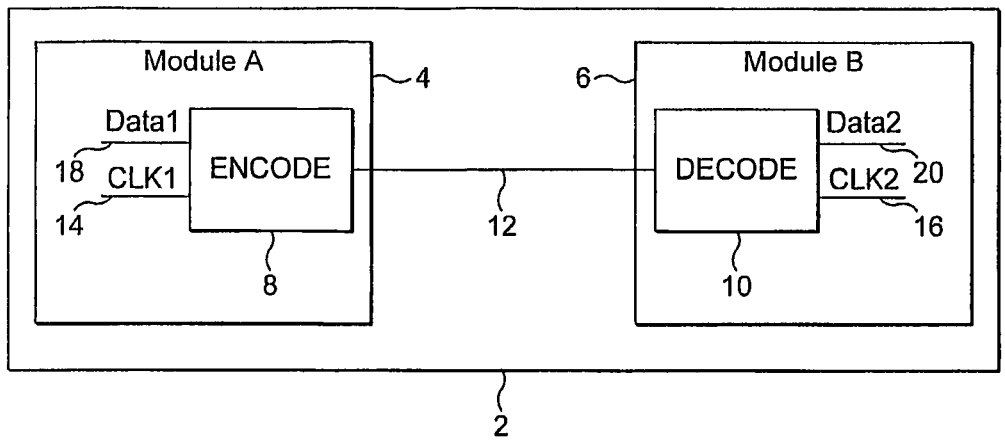
FIG. 1 shows circuitry for communication between two modules on an integrated circuit in which embodiments of the present invention can be incorporated.

FIG. 1 shows circuitry in which data is to be transmitted between a module A, labelled 4 in FIG. 1 and module B, labelled 6 in FIG. 1, both modules being on an integrated circuit 2. Although modules A and module B are illustrated as being on the same chip, it will readily be appreciated that the principles discussed in the following can be implemented in a number of different environments, in particular in a situation where the communicating modules are on different ICs. In prior art embodiments, a parallel bus with separate clock distributed to both modules may have been used between modules A and B in order to transmit data and time information. In such systems the clock frequency must be low enough to allow clean synchronous communication across the plurality signal wires comprising the parallel bus. In order to increase the bandwidth (number of bits of useful communication per second) of the system, the number of wires is increased. Alternatively, in typical asynchronous communications, for example in the RS232 serial port, a single wire carries the bit information which is clocked at a specified clock rate. The two clocks, one in the transmitter, and one in the receiver, are independent and asynchronous in both phase and frequency, but are both within the specified tolerance range. This asynchronous arrangement is typically further refined by continuously adjusting, adapting or locking the receive clock to closely match the characteristics of the transmit clock by inference from the edges in the received data. Nonetheless, the two clocks are independent and hence described as asynchronous.

Serial communications links have a number of problems. They have relatively high latency due to resynchronisation requirements at the destination module. Bandwidth is limited due to the tolerance range specified above. In alternative serial connects where a clock is transmitted alongside data, bandwidth will also be limited by tolerances imposed because of timing variations between the signals. Serial links are also costly due the requirement of generating the necessary high speed encoding and sampling clocks. Encode and decode blocks for serial links also require complex logic, especially if analogue techniques are employed.

According to the embodiments such as the embodiment shown in FIG. 1, a single wire 12 is used between modules A and B to transmit data and timing information. In order to achieve this, a data signal DATA1 on line 18 is encoded by an encode block 8 with a clock signal CLK1 received on line 14 before being transmitted on line 12. A decode block 10 decodes the signal on line 12, to retrieve the data signal, now labelled DATA2 on line 20, and the clock signal CLK2 on line 16. According to this embodiment, CLK1 will have the same frequency as CLK2, however the phase relationship between these clocks is indeterminate.

The system of FIG. 1 can be described as GALS (globally asynchronous, locally synchronous) as will now be explained. Module A includes logic (not shown) clocked by CLK1 which generates the data signal DATA1 on line 18, and module B includes logic clocked by CLK2 which receives the data signal DATA2 on line 20. The logic in Modules A and B is synchronous in that it is clocked by CLK1 and CLK2 respectively. However, as CLK1 is not in phase with CLK2, modules A and B can be said to be asynchronous. Therefore, globally the circuit is asynchronous.

A system for encoding data and timing information onto a single connection 12 will now be described with reference to FIGS. 2 to 5. The underlying principle of the system will be described first with reference to FIG. 2.

FIG. 2 shows timing diagrams for clock signal CLK1 14, a bit_request signal 22, bit_data signal 24, a pulsed_data signal 26, and a pulse_end_n signal 28. The frequency of this clock signal is, for example 100 MHz, however clock frequencies used in other embodiments could be any clock frequency that would work given the particular environment.

Bit_request signal 22 is a common signal used in conjunction with data signals, and when this signal is high, this indicates that the data on bit_data signal 24 is valid.

The bit_data signal 24 indicates the data value whilst bit_request signal 22 is high. The bit_data value transmitted by bit_data signal 24 could be a '1' or '0', represented by a high or low signal: both possibilities are shown in FIG. 2.

According to embodiments described herein, the clock signal CLK1, bit_request and bit_data signals are all encoded into a single signal. This is shown as pulsed_data signal 26. The rising edges of pulsed_data signal 26 occur immediately following rising edges of clock signal CLK1. Therefore, the pulsed_data signal 26 is still valid as a clock signal for any sequential logic clocked by the rising edge of said pulsed_data signal. When this signal is received by module B, the clock signal may be used not only for allowing the retrieval of the encoded data (discussed later), but also for use as a local clock, after suitable buffering, in module B. The buffering delays the clock to produce CLK2 used by the logic in module B and, thus CLK2 must be treated as a separate clock from that used directly for decoding.

As shown by the example illustration of signal 26, data is encoded into the falling edge of the clock signal which can be transmitted on a single wire (line 12 in FIG. 1). This is achieved by altering the timing of the falling edge depending on the data. In the case that at the time of the first rising edge of CLK1 14, the bit_request was low, this indicates there is no valid data to send. This is indicated by the first falling edge of the pulsed_data signal 26 falling at point C, a predetermined delay $\Delta_C$ from the rising edge.

At the second rising edge of CLK1 14, bit_request signal 22 is high, indicating that there is data on bit_data signal 24. In this case, if the data is a '0', the falling edge will be at time A, a delay $\Delta_A$ from the rising edge, and if the data bit is a '1', the falling edge will be at time E, a delay $\Delta_E$ from the rising edge. In this way data is encoded onto the clock signal. In this embodiment, timing locations B and D (at respective delays $\Delta_B$, $\Delta_D$ from the rising edge) are used when decoding the encoded signal, as will be explained in more detail below.

In this example, the request and one bit of data has been encoded onto three possible positions of the falling edge of the clock signal. Thus effectively 3 input bits (clock, request and one bit of data) have been encoded onto a single wire with only 3 variations per period where normal binary logic would require 8 variations for 3 bits. However, the clock does not represent a full binary bit because it is only the rising edge that is of interest. Also, the combination of request and data does not represent two full binary bits because the data is irrelevant when there is no request. In alternative arrangements a single wire with only two or any number more than three possible positions of the falling edge of the clock signal could be used. Such alternative arrangements could be used to encode one, two, three, four or more data bits into each falling edge. Also, as described in more detail below, one or more control functions could be encoded into each falling edge. This would require more, or less, possible timing locations for the falling edge. For example, consider the pulse shown in FIG. 2A, where falling edge location A denotes 00, falling edge location B denotes 01, falling edge location C denotes a null, falling edge location D denotes 10 and falling edge location E denotes 11. It will be apparent when the encoding and decoding circuitry is described below that slight modification to this circuitry would allow a greater number of bits to be transmitted on each falling clock edge. The only limiting factor in the amount of information that can be transmitted is the accuracy of the delay circuitry delaying the falling edges, and the accuracy of the detecting circuitry for detecting the timing of the falling edges in the decode block. However, it is important to note that absolute accuracy of delay elements in encode and decode circuits is not important, only their accuracy in respect to each other.

Finally, the pulse_end_n signal 28 shown in FIG. 2 is a signal that occurs in the encode circuit during the encoding of the data and clock, and this signal will be referred to in relation to the operation of the encoding block.

There are numerous advantages with pulsed serial link described above. This is a genuine single wire connection, with clock, data and data valid encoded on one line. As described below, the encode and decode blocks can be purely digital. Bandwidth is used efficiently. High speed clocks are not required, and nor are analogue techniques. There is also no requirement for an isolated power supply. The logic required for encoding and decoding is minimal, and for higher bandwidth utilisation, the amount of logic scales proportionately. Furthermore, if the clock is stopped during periods when no data is being transferred, the link is power efficient. In the circuit of FIG. 1, when CLK1 is stopped, CLK2 is also stopped and hence all of the logic in module B no longer consumes power.

Figure 3:
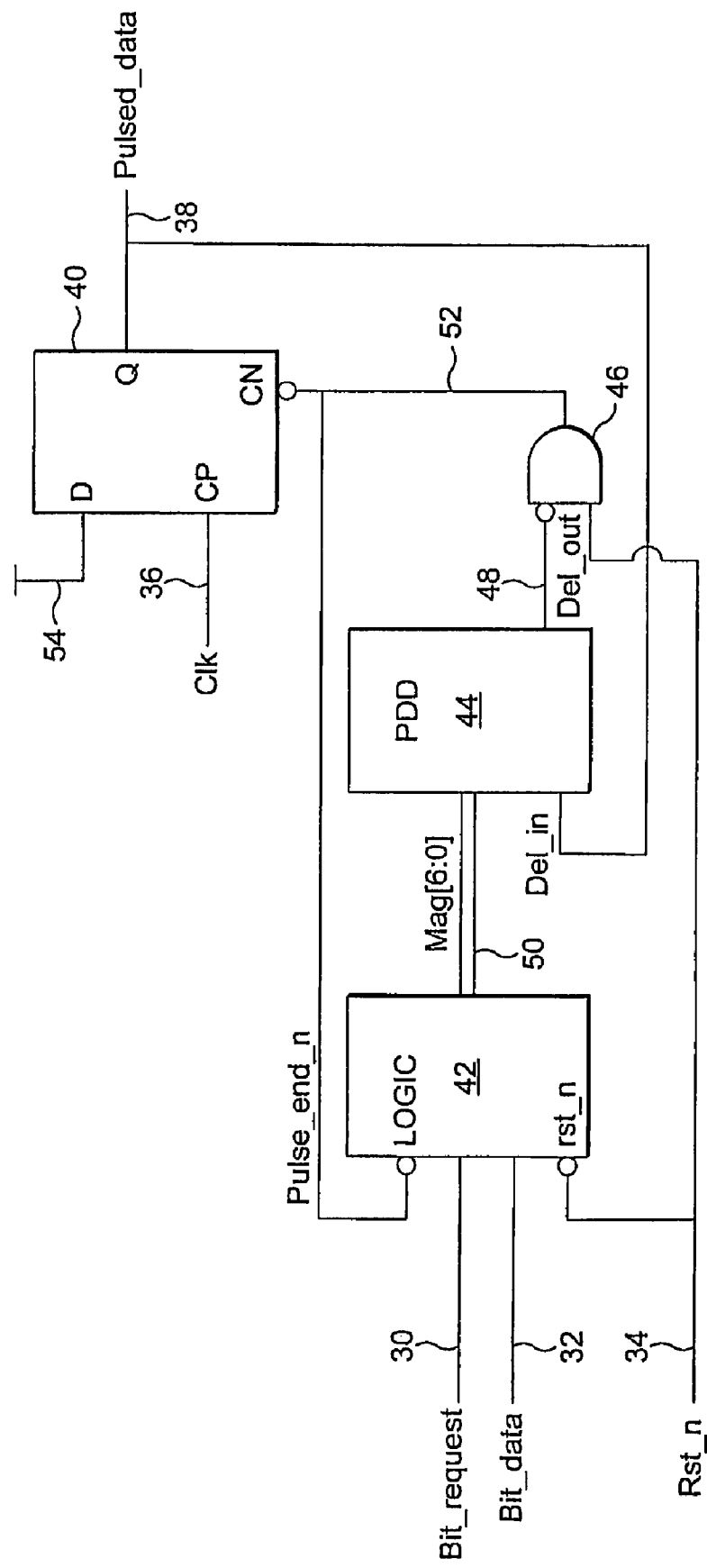
FIG. 3 shows encoding circuitry for encoding data in a pulsed serial link according to another embodiment.

FIG. 3 shows encode circuitry according to one embodiment. As shown in FIG. 3, the bit_request signal is provided on line 30, the bit_data signal is provided on line 32, the clock signal is provided on line 36, and a reset signal, rst_n, is provided on line 34. During normal operation of the encoder circuitry, the reset signal, rst_n, on line 34 will be high, allowing the circuit to function normally. The reset signal, rst_n, is asserted low during power up and in other situations to ensure a clean Initial state across the system on chip (SoC). However, in alternative embodiments other initialisation techniques could be used which do not require this form of reset signal.

The encoder circuitry comprises a D-type flip-flop 40, logic block 42, a programmable digital delay (PDD) block 44, and AND gate 46. The pulsed_data output signal 26 is provided at the output of flip-flop 40 on line 38. The signals bit_request and bit_data on lines 30 and 32 are connected to inputs of the logic block 42. The reset signal, rst_n, on line 34 and a pulse_end_n signal 52 from the output of the AND gate 46 are also connected to inputs of the logic block 42. Based on the values of bit_request and bit_data, and also the values of the rst_n signal and the pulse_end_n signal, the output of logic block 42 labelled 50 is determined.

In the present embodiment, the output of logic block 42 will be a series of control lines 50, in the form similar to a one hot encoding, which control circuitry in the PDD block 44. One hot encoding is a scheme known to those skilled in the art that allows the complexity of system design to be minimised. There are seven control lines in the embodiment shown in FIG. 3, labelled Mag(0) to Mag(6), and on each line a '0' or a '1' may be asserted, with the only legal combinations being all 0's or a continuous run of 1's across any number of Mag(0), Mag(1) through to Mag(6) respectively. For example, if Mag(4) is asserted, then lines Mag(3) to Mag(0) must also be asserted. This is a requirement of the PDD 44 described in the current embodiment, and if alternative programmable delay lines were used, then different combinations of signal might be possible.

The number of these control lines that are asserted high determines the magnitude of the delay Δ of the programmable digital delay block 44 between its input signal, del_in connected to 38 and its output signal, del_out, connected to 48. Seven control lines are provided is this embodiment, which allow reset plus seven different delay values to be selected. The first such selection, when all control lines 50 are zero, is used when in the defined initial condition for the circuit, which is when rst_n is asserted low. The second such selection, when only mag(0) is '1', is the minimum delay, used to control the width of the low going pulse of pulse_end_n on line 52, as explained in more detail below. Five of the remaining different delay values allow the five delays $\Delta_A$ to $\Delta_E$ to be selected.

The programmable digital delay block 44, which is connected to logic block 42 by connection 50, receives the magnitude control signals Mag(0) to Mag(6), and also receives the pulsed_data signal on line 38 from the flip-flop 40. The PDD 44 determines the timing of the falling edge of the pulsed_data signal on line 38. The inverted output of PDD 44 on line 48 is connected to one input of two input AND gate 46. The second input of AND gate 46 is connected to the reset signal rst_n 34. The output of AND gate 46 on line 52 is connected to a not reset input CN of D-flip flop 40, which causes an asynchronous reset of the flip-flop when line 52 is low, independent of the clock input CP 36. This output on line 52 is also connected to logic block 42.

In alternative embodiments, the magnitude of the delay through the PDD 44 may be controlled by any encoding scheme which is different from the one-hot encoding scheme described above, such as straight binary, gray-code, mixed course plus fine, or any encoding to suit the range and selection of the programmable delays required.

Logic block 42 will output low signals on all of the control lines if the reset signal on line 34 is low, irrespective of values on other inputs.

If rst_n is high, and the pulse_end_n signal on line 52 is low, then according to the present embodiment, Mag(0) will be asserted high, and all the other control signals will be low, irrespective of the values of bit_request and bit_data. This will select the smallest time delay from the PDD block 44, used to control the width of the low going pulse of pulse_end_n on line 52.

If rst_n is high, pulse_end_n is high, and bit_request signal 22 on line 30 is low, then this indicates that there is no data, and control lines Mag(4), Mag(3), Mag(2), Mag(1) and Mag(0) will be asserted high by logic block 42, and the rest of this magnitude signal will be controlled to be low. This will result in a delay value being programmed in the PDD block 44 equal to delay $\Delta_C$ shown in FIG. 2. It should be noted that this delay is calculated from the rising edge of the pulsed_data signal 26.

If on the other hand the bit_request signal on line 30 is high, then the values on the control lines will depend on the data bit to be transmitted. If bit_data signal on line 32 is a '0' (low), control lines Mag(2), Mag(1) and Mag(0) will be asserted high and the rest of the control lines will be low. This would control the PDD block 44 to give a delay equal to $\Delta_A$. If the data bit is a '1' (high), then all of the control lines Mag(6) to Mag(0) will be asserted, giving the greatest possible delay. This would control the PDD block 44 to give a delay equal to $\Delta_E$.

In practice, because the delays through components 40, 42 and 46 in FIG. 3 are significant with respect to the individual delay steps of PDD 44, then the actual width of the pulsed_data high pulse will be different from the programmed delay through PDD 44. However, since the delay steps of the programmable delays in the decoder match the delays steps of PDD 44 in the encoder to an acceptable tolerance, then any implementation offset can be compensated at the design stage in either encoder or decoder.

Operation of the encoder circuitry of FIG. 3 will now be described with reference to the timing diagrams in FIG. 2. As explained above, flip-flop 40 provides the pulsed_data output on line 38. The D input to this D type flip-flop is connected to line 54, which is connected high (logic '1'). Therefore whenever the clock input on line 36 goes high, output Q of the D flip-flop will go high shortly afterwards. However, the reset input of the D type flip-flop 40 is connected to line 52. This reset input is inverted, and therefore whenever the pulse_end_n signal on line 52 goes low, the output of the flip-flop will be reset to 0. The timing of this reset determines the timing of the falling edge of the pulsed_data signal 38.

As shown in FIG. 2, shortly after the first rising edge of CLK1, the pulsed_data signal goes high. This is because the high input at the D input of flip flop 42 is clocked by CLK1, and output at the Q output of the flip flop. Note that the pulse_end_n signal on line 52 is high, and therefore the D flip flop is not being reset.

The rising edge of the pulsed_data signal will arrive at the PDD block 44, and the time delay provided by this block will be determined by the values of the control signals Mag(6) to Mag(0). These signals are provided by logic block 42, and as the reset signal, rst_n, is high and the pulse_end_n signal is high, but the bit_request signal 30 is currently low, magnitude control lines Mag(4) to Mag (0) will be asserted high, and the other lines will be low. This means that the output of a programmable digital delay block 44 will rise at time C, which is a certain delay after the rising edge of the pulsed_data signal, controlled by the programmable digital delay circuitry.

The rising edge of the delay block output on line 48 will cause the pulse_end_n signal on line 52 to go low, as the signal at the inverted input of AND gate 46 will now be high. The falling edge of the pulse_end_n signal 28 in FIG. 2, on line 52 will in turn cause the flip-flop 40 to reset, causing the pulsed_data signal fall to 0 at time C, very shortly after the delayed rising edge at the PDD output. This is shown in FIG. 2 by arrow 30.

The falling edge of pulsed_data signal on line 38 will also arrive at the input to the programmable digital delay. This time, the control signals provided by logic block 42 will be different. This is because the pulse_end_n signal is now low, and in this situation, as explained above, only Mag(0) is asserted high, and the remaining control signals are asserted low. This provides the minimum delay step through PDD 44. Therefore, following this minimum delay after the falling edge of pulsed_data, the pulse_end_n signal will return to high, releasing the asynchronous inverted clear input to flip-flop 40 again. However, it will not be until the next rising edge of clock signal 36 that the activation of the flip-flop 40 is noticed at the output. Note that a minimum delay is used for the low width of pulse_end_n 52, but if implementation analysis revealed any timing hazard, then this minimum delay could be increased by one or more steps.

On the next rising edge of CLK1, once again the pulsed_data output on line 38 will go high. This rising edge will arrive at the programmable digital delay block 44. This time reset, rst_n, and pulse_end_n are both high, and bit_request is also high. Therefore the control signals 50 will be determined by the bit_data signal on line 32.

As mentioned above, if the data bit were a '0', then control signals Mag(2) to Mag(0) would be asserted, and if the bit_data value were a '1', then control signals Mag (6) to Mag(0) would be asserted. In the case of a '0' bit, the pulse_end_n signal will fall at time A. This would then reset the D flip-flop 40 and cause the pulsed_data output 38 to drop shortly after point A. The falling edge of the pulse_end_n signal on line 52 would cause logic 42 to then assert only control signal Mag(0), providing the minimum delay until the pulse_end_n signal rises again.

Alternatively, if the data bit on line 32 were a '1', then the pulse_end_n signal would fall at time E, causing the D flip-flop 40 to reset and pulsed_data signal 38 to fall. Again, the falling edge of the pulse_end_n signal on line 52 will cause logic 42 to assert only the control signal Mag(0), meaning that the pulse_end_n signal will rise again after the minimum delay step.

PDD 44 is used to control the high width of pulsed_data via bit_request 30 and bit_data 32, and is also used to control the low width of pulse_end_n 52. It is important that this minimum width of pulse_end_n low is controlled in order to avoid asynchronous timing problems which could be induced if pulse_end_n 52 was allowed to merely to glitch low. A minimum delay value is used here, rather than no delay at all, as if implementation analysis reveals any timing hazard, the minimum delay may be increased by one or more steps.

Another subtlety of this design is the property that pulse_end_n input to 42 causes the designated minimum delay code to be set on 50. The design of the PDD 44 is such that all 1's which may be residual in the PDD, as a consequence of a long pulsed_data high pulse width to encode a requested bit_data value of 1, are cleared by the selection of this minimum delay. This means that the next rising clock edge on 36 can occur shortly after the minimum delay following the latest falling edge of pulsed_data. If this were not the case then the next clock edge could not safely occur until after pulsed_data had been low for the maximum delay.

The pulsed_data signal on line 38 will be transmitted via line 12 to module B, where it will be decoded by a decode block 10. Decoding of the pulsed_data signal will now be described with reference to FIGS. 4 and 5.

Figure 5:
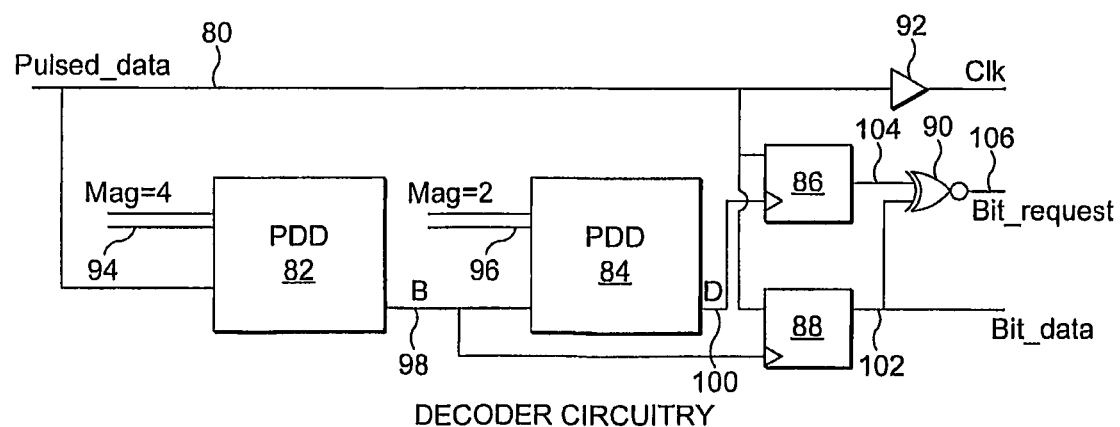
FIG. 5 shows decoding circuitry for decoding data and timing signals from the encoded signal of FIG. 3.

FIG. 5 shows decoder circuitry. Two programmable digital delay blocks are provided labelled 82 and 84. The output of the programmable digital delay block 82 is connected to the clock input of a first D flip-flop 88. The output of the second programmable digital delay block 84 is connected to the clock input of a second D flip-flop 86. The pulsed_data signal is input on line 80 and provided to the input of the PDD block 82. The output of PDD 82 is provided to the input of the PDD 84. Alternative arrangements might implement a single digital delay, which does not need to be programmable, but provides output taps equivalent to magnitudes 4 and 6 respectively.

The output of D flip-flop 88 provides the bit_data signal. The output of the flip-flop 86 on line 104 is connected to one input of a two input exclusive NOR gate 90. The second input of the exclusive NOR gate 90 is connected to the output of flip-flop 88. The output of exclusive NOR gate 90 on line 106 provides the bit_request signal.

The clock is also retrieved from the pulsed_data signal having been passed through a Buffer 92. As described above, the clock is preferably used to clock logic in the destination module. A clock tree would be used to distribute the clock to this logic, and Buffer 92 is provided to drive the clock tree loading. A greater number of buffers may be required for this purpose. It should be noted that there may be a significant delay, possibly more than one period of the clock, in propagating the clock through such a clock tree.

Figure 4:
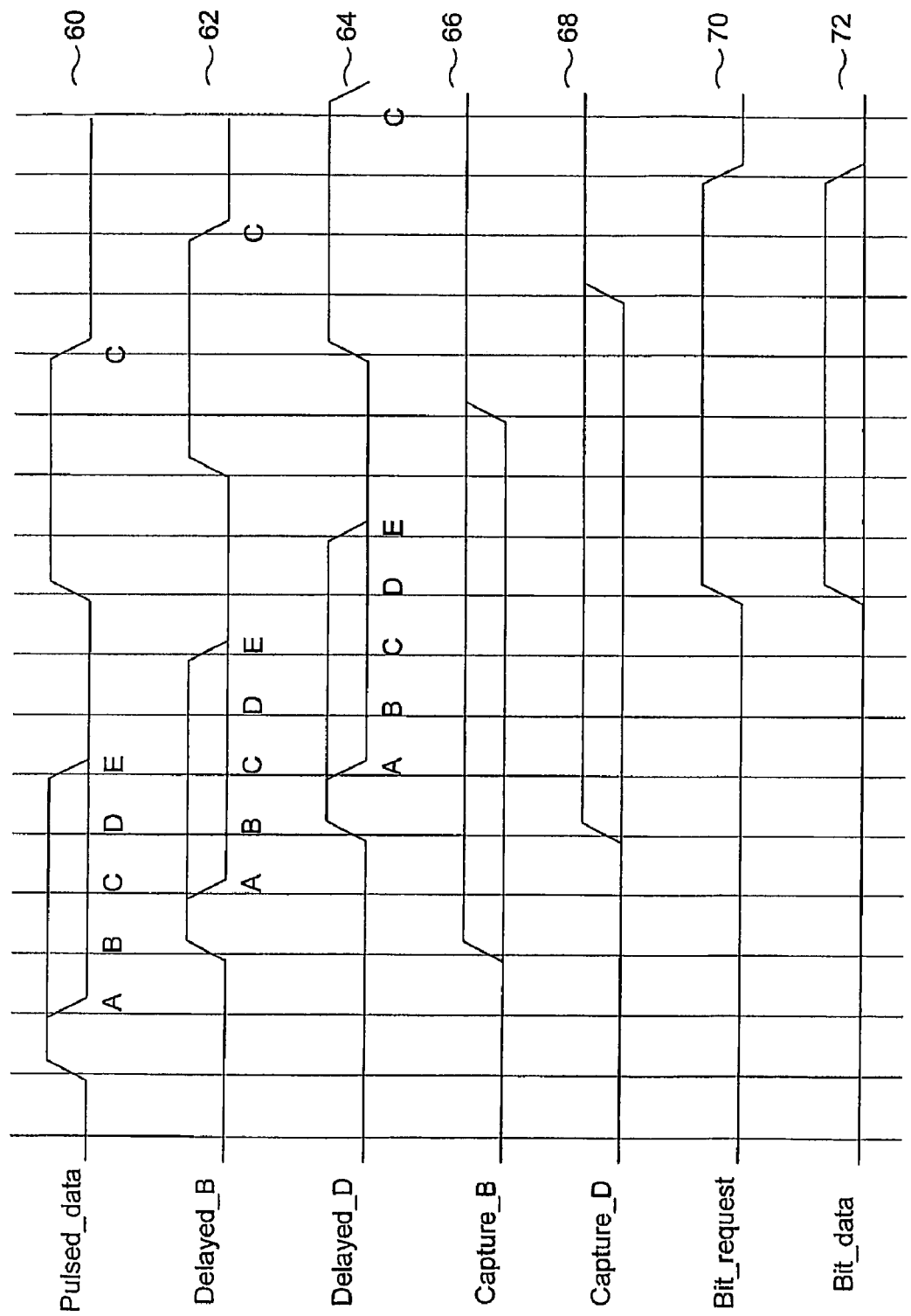
FIG. 4 shows data and timing signals recovered from the encoded signal of FIG. 3.

The programmable digital delay blocks 82 and 84 provide measuring gauges in order to determine the timing of the pulsed_data signal. The output of a first delay block 82 is at time B. Signal 62 shown in FIG. 4 illustrates the signal on line 98 output of PDD block 82. As shown by signal 62, the rising edge of this signal is aligned with position B of the pulsed_data signal. In order to provide this delay, control lines Mag(6) to Mag(0) are used to control delay elements in the PDD blocks 82 and 84 in a similar fashion to the previous example. However, in the PDD 82 and 84, the values on the control lines to each PDD 82 and 84 will usually be fixed so that the delay selection provided by these blocks remains constant.

In order to give a delay at time B, control signals Mag(3) to Mag(0) will be asserted high, and the remaining control signal asserted low. The output of the PDD block 82, delayed to time B, is provided to the PDD block 84. PDD block 84 outputs the pulsed_data signal after a delay to time D. Control signals Mag (1) to Mag (0) are asserted on lines 96 at the input to PDD 84 in order for PDD 84 to have the required delay.

As explained above, the pulsed_data signal, as shown in FIGS. 2 and 4, has three possible positions of the falling edge at times A, C, or E. The pulsed_data signal will arrive on line 80 of the decode block shown in FIG. 5. Consider sampling the pulsed_data at positions B and D respectively. If the values sampled at B and D are both low, then the falling edge must be at position A. If the values sampled at B and D are high and low respectively, then the falling edge must be at position C. If the values sampled at B and D are both high, then the falling edge must be at position E.

According to the encoder, described above, position A represents a valid data bit 0, position C represents no valid data, and position E represents a valid data bit 1. It can be seen that for valid data, sampled values at B and D are either both high, or both low; and if both values at B and D are high or low, the data value can be extracted by looking at either sample. In the embodiment shown in FIG. 5 the sampled value at B is used to extract the data bit. When there is no valid data, then the values sampled at B and D are different, being high and low respectively; hence the data valid signal bit_request can be extracted by the logical exclusive NOR function. Alternatives allow such logic extraction to be automatically optimised and could implement any boolean equivalent. Again, alternatives of the sampling points and boolean logic would allow for alternative numbers of falling edge positions, numbers of bits encoded and alternative coding schemes.

In the preferred arrangement, the sampling mechanism to capture the value at position B is to clock the value of the pulsed_data 80 at the D input of flip-flop 88, using a clock edge at position B. The clock edge is simply created by delaying the pulsed_data 80 by passing it through PDD 82 with appropriate settings on its magnitude inputs 94. The output of flip-flop 88 on line 102 is the value sampled at position B. This signal, is shown in FIG. 4 labelled Capture_B 66. Likewise, the sampling mechanism to capture the value at position D is to clock the value of the pulsed_data 80 at the D input of flip-flop 86, using a clock edge at position D. This clock edge is created by further delaying the delayed_B 98 by passing it through PDD 84 with appropriate settings on its magnitude inputs 96. The output of flip-flop 86 on line 104 is the value sampled at position D. This signal is shown in FIG. 4 labelled capture_D 68. The extracted bit_request 106 is the output of the exclusive-NOR gate 90, with inputs capture_B on line 102 and capture_D on line 104. The capture_B output from flip-flop 88 on line 102 is the extracted bit_data signal, shown as signal 72 in FIG. 4.

As described previously, the programmable delay lines in the encode and decode blocks are preferably programmable digital delay blocks. A programmable digital delay blocks will now be described with reference to FIG. 6.

Figure 6:
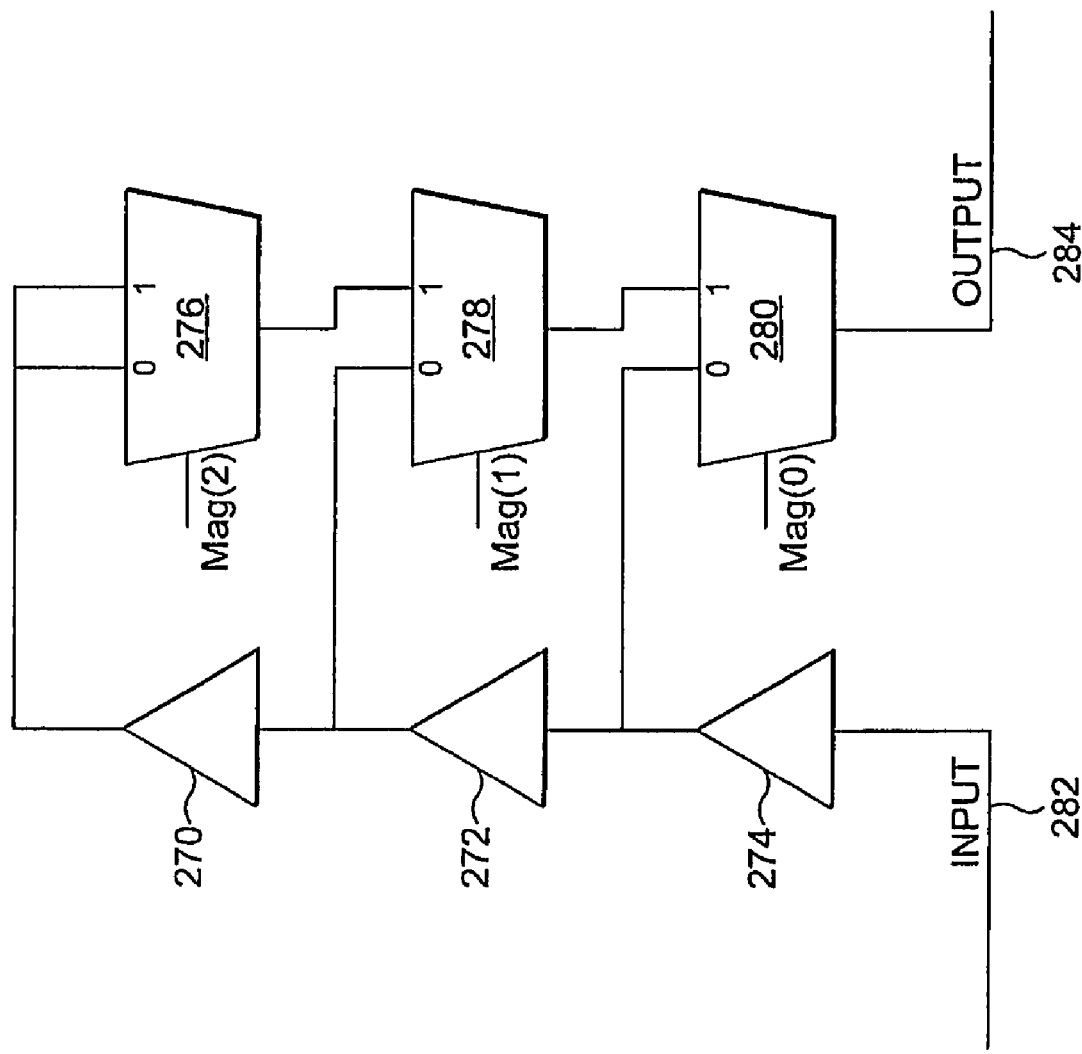
FIG. 6 shows one possible embodiment of a programmable digital delay line.

FIG. 6 shows a programmable digital delay line in which the input to the delay line on line 282 is connected to a number of delay elements 270, 272, 274 which are connected in series. Three multiplexers are provided, which are labelled 276, 278, 280. Each multiplexer has two inputs, labelled '0' and '1'. If the control signal to a multiplexer is a '0', the '0' input will be selected. If the control signal is a '1', the '1' input will be selected.

The '0' input of each of the multiplexers 270 to 274 is connected to a different point on the delay line. For example, the '0' input to multiplexer 280 is connected to the output of delay element 274. In the case of the last multiplexer in the line, which in this case is multiplexer 276, both of its two inputs are connected to the output from the last delay element in the line, delay element 270. The second input to each of the other multiplexers in the circuit is connected to the output of the previous multiplexer. For example, the '1' input to multiplexer 278 is connected to the output of multiplexer 276. The '1' input to multiplexer 280 is connected to the output of multiplexer 278. In this circuit, the output of multiplexer 280 on line 284 provides the output of the delay line.

Operation of this delay line circuit is as follows. Each of the multiplexers 276 to 280 has a control input, and these are labelled Mag(2) to Mag(0) respectively. If multiplexer 280 is controlled to output the signal received at its '0' input, the signal of the output of delay element 274 will be selected for output. In this case the overall delay at the output 284 would be equal to the delay of delay element 274, and the delay added by multiplexer 180. If however, multiplexer 280 is controlled to output the input received at its '1' input, and multiplexer 278 is controlled to output the input received at its '0' input, the signal at the output of delay element 272 will be connected via multiplexers 278 and 280 to the output 284. In this case, the total delay to the input signal present at the output on line 284 would be equal to the delay added by delay elements 274 and 272 and the delays added by the multiplexers 278 and 280. This will always be greater than the delay when only one delay element is selected. Thus in this circuit, monotonicity is always maintained, as the more delay elements that are selected, the greater the delay at the output.

It will be obvious to those skilled in the art that although only three delay elements and three multiplexers have been shown in this circuit for clarity, in practise the number of delay elements and multiplexers could be any required number, for example 500 or more. These would be provided in the series, connected in a similar fashion to delay 272 and multiplexer 278.

The minimum selectable delay in the circuit of FIG. 6 will be when only delay element 274 and multiplexer 280 are selected. If delay element 274 is a very small delay, then this smallest delay can be a lot smaller than smallest delay selected by the multiplexer tree.

Another advantage of the circuit layout in FIG. 6 is that the delay line may be positioned relatively freely on the chip in whatever layout is required by the chip designer. The delay elements and multiplexers could be arranged in one long line, or alternatively they could be arranged in a zig-zag. In either case, the performance of the delay line would not be affected.

Figure 7A:
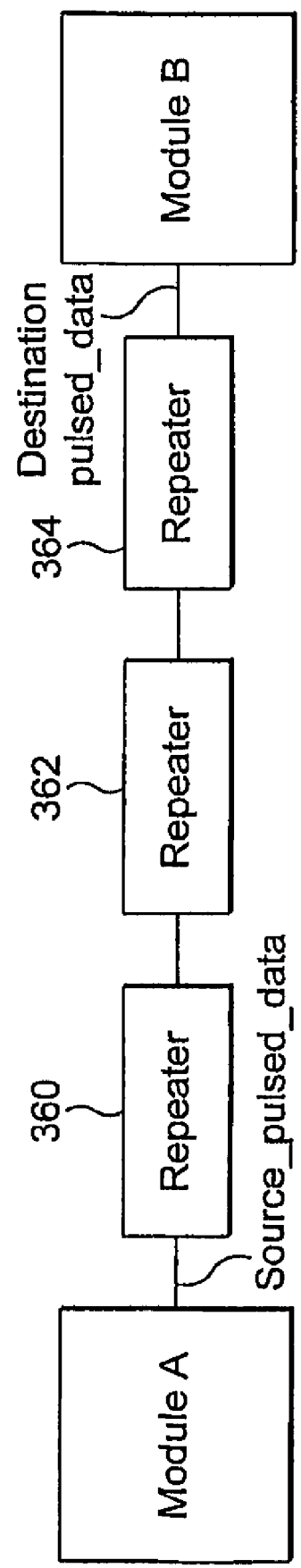
FIG. 7a shows a series of repeaters used for communication between two modules.
Figure 7B:
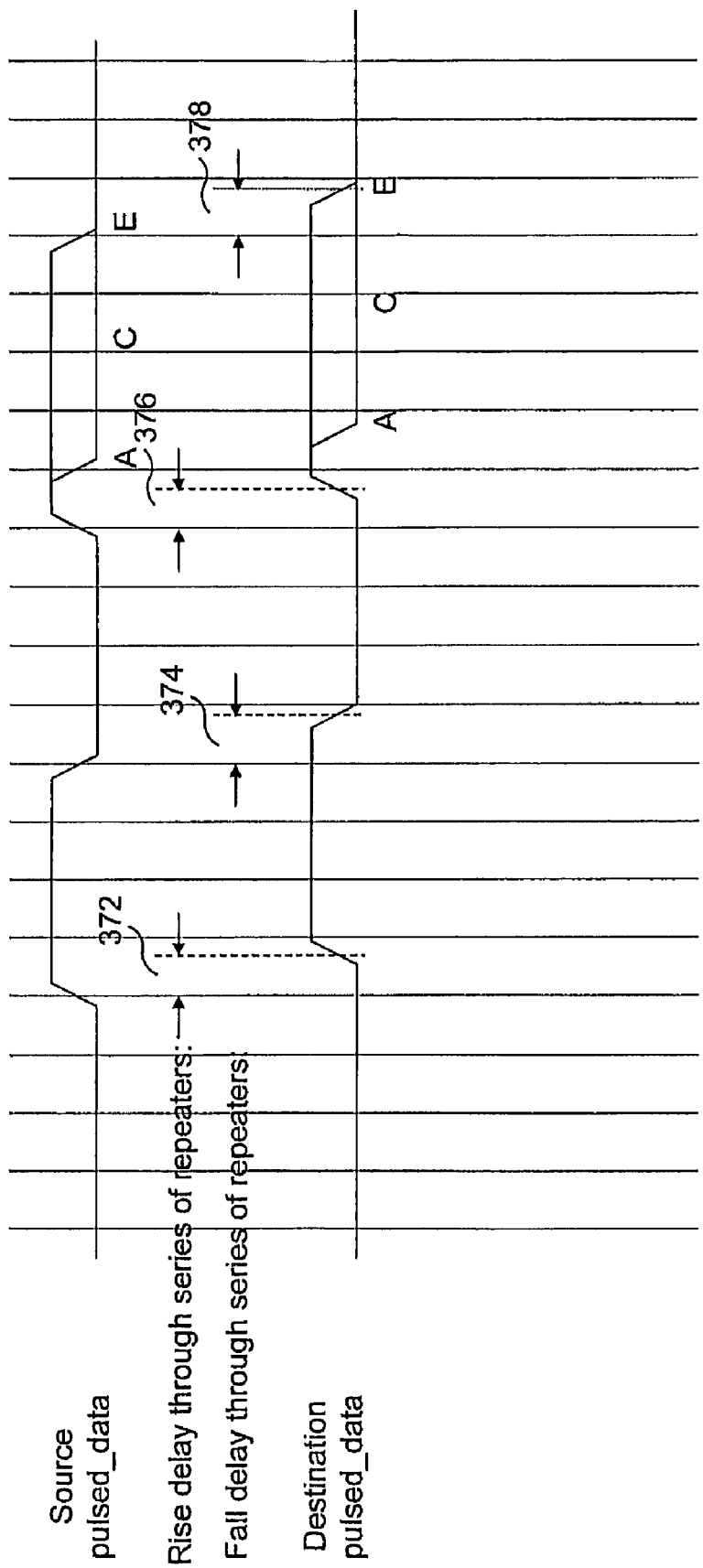
FIG. 7b shows timing of signals in FIG. 6 according to one example.

Reference will now be made to FIGS. 7a and 7b. FIG. 7a shows the use of repeaters between two modules A and B on a chip. As with the circuit of FIG. 1, these modules could alternatively be on separate chips. If the track between modules A and B is relatively long, then high drive strengths will be required in order to overcome capacitance in the line. Lines with high drive strengths risk being cross-talk aggressors, meaning that they interfere with other lines on the chip. The solution is generally to limit the maximum length on any one track.

A problem with limiting track lengths is that the maximum length is small in comparison to the distances between logic blocks on an SoC, or between SoCs. This can be solved by placing "repeaters" along the length of the connection between its endpoints, such that the distance between the repeaters is less than the maximum length. As shown in FIG. 7a, in this circuit three such repeaters, labelled 360 to 364, are necessary between modules A and B.

For a parallel bus, significant timing margins need to be provided to allow for the overall delay through the required number of repeaters, and the maximum variation in delays between all paths. The clock frequency is generally reduced to allow for these delays. Alternatively, a clock can be routed alongside the data so that the overall delay is eliminated, however, the variations in delay across the many tracks will still need to be taken into account. Furthermore, in this situation it would also be necessary to resynchronise the data, which impacts performance due to the latency overhead of resynchronising data.

Serial communication links overcome some of the above problems, however there will still be variations in delay between a clock signal and the data line that have to be dealt with.

By implementing a serial connection as described above, using pulsed_data on a Pulsed Serial Link, a number of these problems are overcome, as will now be explained with reference to FIG. 7b.

FIG. 7b shows examples of a source pulsed_data signal as it leaves module A, and a destination pulsed_data signal that arrives at module B. The rising and falling edges of the pulsed_data signal will be delayed through the three repeaters and the line, but not necessarily by equal amounts. Delays 372 and 376 shown in FIG. 7b are the delays to the rising edges. Delays 374 and 378 shown are the delays to the falling edges.

Importantly, the absolute delay to the pulsed_data signal will not affect the ability to decode the signal, as it is only the timing between the positive edge to the falling edge at A, C or D that contains the data. The absolute delay for a given edge will be affected by the following PVT (process, voltage, temperature) parameters, which, as indicated, will be largely irrelevant when the modules are on the same silicon:

Process (P) variation will be slight because the link and blocks are on the same silicon;

Voltage (V) will be constant across the whole of the chip, apart from locally induced noise effects;

Temperature (T) will be constant because the all of the silicon is at the same temperature.

The main contributor to variations in delay (for a given edge) is locally induced noise effects. These are small compared to PVT variations. Such variations do need to be taken into account in the overall timing analysis of a pulsed serial link. However, it should be noted that the increase in noise margin does not increase linearly with the number of buffers (statistical analysis required).

Therefore there is no limit on the physical distance between communicating blocks, as there is no constraint in the number of repeaters that may be used and the absolute delay that may be added. Furthermore, the clock signal does not have to be limited to meet the timing constraints described above, and therefore the bandwidth is not compromised by the overall distance of the link.

According to embodiments of the pulse data circuitry described above, the difference in delay between opposite polarity edges (the difference between 372 and 374) is largely irrelevant. However, it is important that the delay from each positive edge to the next positive edge is tightly controlled, and also, independently, the delay between each negative edge and the next is tightly controlled.

The design of logic to implement a repeater would be straightforward for one skilled in the art. It does not require a clock (or reset) to be connected to the repeater. The embedded data is not decoded and then reconstituted, so the repeater design is independent of any particular coding scheme. There are no special power supply or other analogue requirements, and repeaters can be instanced by automated tools. Depending on available chip area for encode and decode blocks, and the required bandwidth, different numbers of selectable pulse widths can be used to encode the data onto the serial connection. For lower bandwidth requirements, then two selectable pulse widths can be used to carry simple binary data. The bandwidth efficiency is essentially one bit of data per clock period, minus any serial protocol overheads. The encoding and decoding of the pulsed serial link with only two selectable pulse widths can be achieved with only a handful of gates.

For higher bandwidths, then a large number of pulse widths can be used. Additional steps need to be taken to ensure that the resolution between successive pulse widths can be both accurately encoded and accurately decoded. This may been the addition of calibration techniques or other sophistications. With a larger number of pulse widths, then more logic is required to store and transform the information in both encoder and decoder. There is a straight forward cost performance trade-off. Applications requiring higher performance will need larger encoders and decoders and will therefore cost more.

Whatever the number of selectable pulse widths chosen for the connection, flow control is beneficial in order to ensure that data is transmitted and received correctly. Flow control circuits and methods will now be described with reference to FIGS. 8 to 14.

As described above with reference to FIG. 2, a bit_request signal can be used to indicate when data is valid. In the scheme proposed above, this information is encoded onto the pulsed serial link by using pulse width 'C' when data is not valid, and pulses widths 'A' and 'E' for data at all other times. In this system it is assumed that the receiver is always able to receive data, and therefore no acknowledgement signal is required. However, in situations, such as those described below, in which the receive module comprises an input buffer with limited memory in which received data bytes are stored, some flow control will be necessary.

In most situations where data is to be transferred from one module or circuit to another, a handshake of some type will be required. This is to ensure that when data is transferred, both modules are in agreement that the data is being transferred. If the transmit and receive modules are synchronous, the handshake protocol between the modules is generally known as a request-grant protocol. In such synchronous systems a common clock controls the timing of data being transmitted between the modules. It is however necessary that both modules agree that data may be transmitted, and therefore a request signal is transmitted from the transmit module to indicate that there is data to be transmitted, and the receive module responds with a grant signal indicating that the data can be sent.

In asynchronous systems, in which the transmit and receive modules are controlled by different clocks, the handshake protocol between the modules is generally referred to as a valid-ack protocol. In this case, some circuitry will be required in each module to retime data signals and the handshake signals to the clock environment receiving the signal. According to the valid-ack protocol, a valid signal is transmitted from the transmit module to the receive module to indicate that data is ready to be transmitted, or is being transmitted. Either before or after the data is transmitted, an acknowledgement signal is sent back to the transmit module from the receive module, indicating in the former case that the receive module is ready to receive data, or in the latter case that data has been received, and that the receive module is ready for more data.

Flow control in the pulsed serial link as described below operates differently from these handshake protocols, as flow control signals may be encoded into the data transmitted on the pulsed serial link. It is still necessary that both the transmit module and receive modules are in agreement before data is transmitted, to ensure that input buffers in these modules do not overflow. According to the coding schemes described below, valid information is conveyed by transmitting an idle pulse when data is not valid or alternatively a data size code preceding the data to indicate that valid data will follow. An acknowledgement signal is transmitted via a return path from the receiving module back to the transmitting module, and as described below, the return path is also a pulsed serial link connection and the acknowledgement can be encoded onto the return path in a number of ways.

FIG. 8 shows a communications link which communicates using the pulse serial link connection described hereinabove. Parallel data arrives at a pulse serial encode block 110 and is encoded onto a single line as described above. This data is then transmitted to the pulse serial decode block in a second module, labelled 114, via a number of repeaters in block 112. The output from the decode block 114 is parallel data. As shown in FIG. 8, an acknowledgement line 116 is provided between the decode block 114 and the encode block 110 such that an acknowledgement signal can be transmitted when the data has been correctly received.

Using an extra connecting wire for the return acknowledge path results in poor use of available bandwidth per connection and greatly reduces the benefit gained by the single serial pulse link. In many applications, information flows in both directions, such as traditional memory read operations, where the address from where the requested data is located is sent to the memory, and the data contents at that address location are returned. So for a bidirectional data link, the ack's can be encoded into the data stream in the reverse direction.

FIG. 9 shows a communications link using the pulse serial connection as described above, in which acknowledgement signals are sent down the same lines as the data. As shown in FIG. 9, a bidirectional link is implemented in this example, in which outward data is encoded by encode block 140, and transmitted to decode block 144 in the receive module via repeaters 122. The receive module encodes return data in block 150, and transmits this back to the first module via repeaters 128 where the data is decoded by the decode block 146.

The decode block 144 in the receive module acknowledges receipt of the transmitted data by asserting an acknowledgement signal ack_tx1 on line 138 and this signal is then encoded by encode block 150 to be returned to the transmitting module. This acknowledgement signal transmitted from the receive module back to the transmitting module is receive by decode block 146 and forwarded to encode block 140 of the transmitting module on line 134. This confirms to encode block 140 that the data was successfully received.

In a similar fashion the decode block 146 of the transmitting module acknowledges receipt of returned data from the receive module by asserting a signal on line 132 which is then encoded by encode block 140 and transmitted to the receive module. The acknowledgement signal from the transmitting module to the receive module is received by the decode block 144 and forwarded to the encode block 150 on line 136 such that encode block 150 knows that the return data was successfully received by the transmitting module.

In each case, the acknowledgement signal is sent when data has been received by decode block 144 or 146, provided that the input buffers (not shown in Figures) in these blocks are not full. Data is emptied from these input buffers in the decode blocks for output on the parallel data lines under the control of processors in the receive or transmit modules. For example, data received in the input buffer of decode block 144 is output on the parallel connection labelled parallel data rx1 under control of a processor in the receive module. The input buffer in block 144 may for example have memory to store three bytes of data, and provided there is room in the buffer to receive at least one more byte of data, the acknowledgement signal is generated and returned to encode block 140 indicating that the last byte has been received, and that the buffer is ready to receive more data. If however there is less than one byte of free memory in the receive buffer, the acknowledgement signal will not be sent, and no more data will be sent from encode unit 140 until the receive module has emptied data from the receive buffer.

Although the example of one byte of data is given, in alternative embodiments more or less data may be received before an acknowledgement is generated, In slightly different embodiments, the acknowledgement is generated by the logic that empties the data from the input buffer. This logic indicates when it is ready to receive more data by generating the acknowledgement.

One acknowledgement signal is required for every byte of data transmitted and this data is represented by one or more pulses on the pulsed serial link. In alternative embodiments, an acknowledgement may be required more or less often. Also, according to the present embodiment in which the input buffers in the decode blocks may store three bytes of data, three bytes of data may be sent before any acknowledgement is sent. However, once three bytes of data have been transmitted, only one byte may be transmitted for every acknowledgement received, to prevent overflow of the input buffer. In alternative arrangements, acknowledgements could be sent in advance of data. For example, three acknowledgements could be transmitted prior to data being transmitted, indicating to the transmit module that three bytes of data may be sent. Further acknowledgements would then be sent once more room is available in the input buffer of the receive module.

For applications that do not require any return data, implementing the return ack path over a separate return pulsed serial link has several advantages:

- The same logic and implementation is used for unidirectional and bidirectional applications. This saves on development time and ensures that a common approach is used.
- All of the system level considerations are the same for both unidirectional and bidirectional. The design of routing logic, switches, repeaters and anything else is the same.
- The return path carries all of the advantages of a pulsed serial link, especially the relationship between the ack and an appropriate clock.
- Where necessary, the logic of the return path pulsed serial encode and decode can be thinned out so as to only carry the acknowledgement.

One problem with the arrangement described above is the relationship between the acknowledgments and the clock of the block to which they are directed. The concept of the pulsed serial link works very well for data that is passed down a link, possibly through several repeaters. It is a key property of the pulsed serial link that the clock is carried on the same single wire as the data. It does not matter how much delay there is in the path, wherever the pulsed link ends up, the relationship between clock and data is well defined. In particular it should be noted that the receiver (PSDecode1) and the received parallel data (rx1) are clocked by the positive edges of the received pulse stream. This means that the transmitter (PSEncode0) and receiver (PSDecode0) at the same end of a bidirectional pulsed serial link are clocked by different clocks. Therefore, the signals shown to be crossing between these blocks (ack_tx0, ack_rx0) are passed between different, asynchronous, clock environments and potentially cause metastability problems, as discussed in co-pending U.S. patent application Ser. No. 10/816,799. One solution would be to change each of the signals which cross clock environments into a double handshake protocol and use an appropriate number of synchronization flip-flops, as will now be explained with reference to FIG. 10.

FIG. 10 shows communication link circuitry in which a double handshake protocol is implemented between the pulse serial decode and encode blocks in the receiving module and transmitting module. Although in this example a double handshake protocol is used, in alternative embodiments any suitable handshake protocol could be used to ensure correct transmission of the data.

As shown in FIG. 10, each of the encode and decode blocks 140, 144, 146 and 150 are in different clock environments. It is therefore necessary that acknowledgement signals cross clock boundaries. To avoid metastability issues, a double handshake protocol is proposed, as depicted by the pairs of arrows between encode block 140 and decode block 146, and decode block 144 and encode block 150. In the place of each acknowledgement signal as shown in FIG. 9, two lines are now provided for sending the acknowledgement data. For example, in place of acknowledge line 132, lines 120 and 124 are now provided for transmitting the acknowledgment signal between these blocks. Each of these lines is connected to a synchronizer so that the timing of the signal is resynchronised to the correct clock environment. For example, line 120 is connected to a synchronizer in encode block 140 such that the signal is retimed from the clock environment rx0 to tx0. Synchronizers are known in the art, and generally comprise one or more flip-flops clocked by the clock of the circuit receiving the signal.

According to the double handshake protocol, when data, in this case the acknowledgement signal, is ready to be transmitted from one of the decode units, a handover signal is asserted on the line going to the associated encode unit. For example, when decode unit 144 has received a block of data and is ready to transmit an acknowledgement signal, a handover signal, for example a logic '1', is first asserted on line 160 to encode block 150. In some handshake protocols the handover signal would indicate that data is ready to be transmitted. However, in the present case the data is a 1-bit acknowledgement signal, and therefore the handover signal itself effectively communicates this acknowledgement.

When encode block 150 has received the handover signal, it responds by generating a shakeback signal, indicating that the acknowledgement signal has been received. This is done by asserting logic '1' on the return path to decode unit 144 on line 168.

This protocol is a "double" handshake because the handover signal remains high until the shakeback signal is asserted, and then the handover signal falls followed by fall of the shakeback signal. Thus there are four edges in total for each single transfer of an acknowledgement. Once the protocol has been completed, the acknowledge signal can then be encoded by encode block 150 onto the pulsed serial link, and forwarded from decode unit 146 to encode unit 140 in a similar fashion.

In alternative embodiments a different protocol could be used, for example a single-handshake equivalent where the rising edges of the handover and shakeback signals indicate one acknowledgment transfer and the falling edges of the handover and shakeback signals indicate a second acknowledgement transfer. The logic for such a protocol is more complex however the turnaround time is halved.

In order for the parallel data signals decoded by decode block 144 and 146 in FIG. 10 to be used by circuitry in the transmit and receive modules, this data will need to be retimed to the clock environment of the transmitting or receiving module that wishes to use the data. For this dual port buffers may be used. These are illustrated in FIG. 11, labelled 152 and 154.

Figure 11:
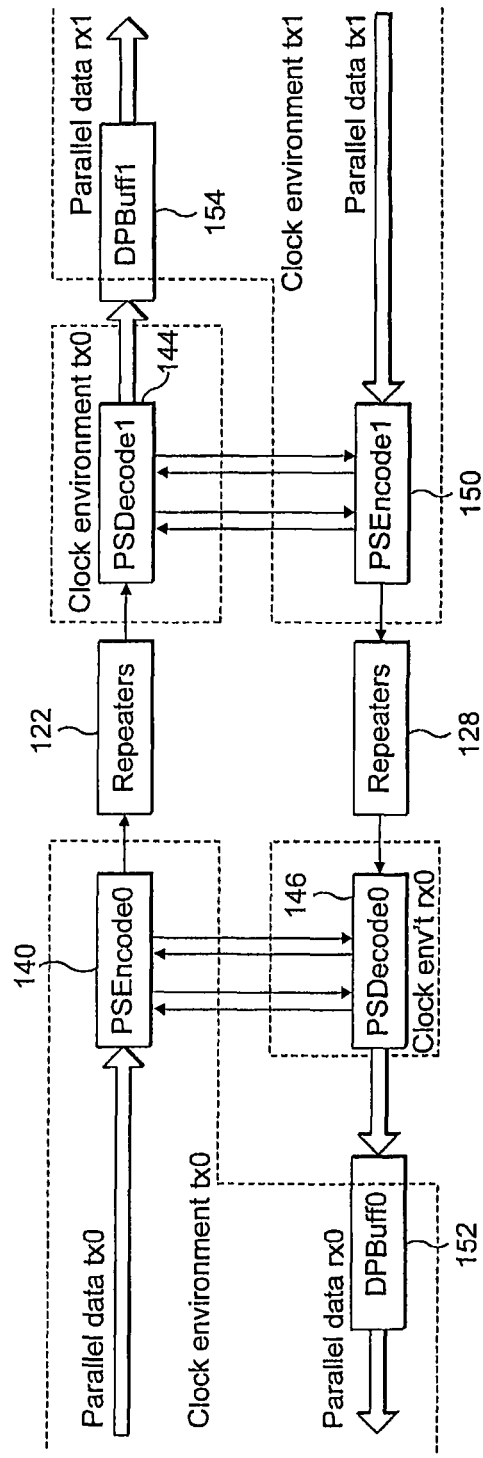
FIG. 11 shows a communications link including dual port buffers according to another embodiment of the present invention.
Figure 15:
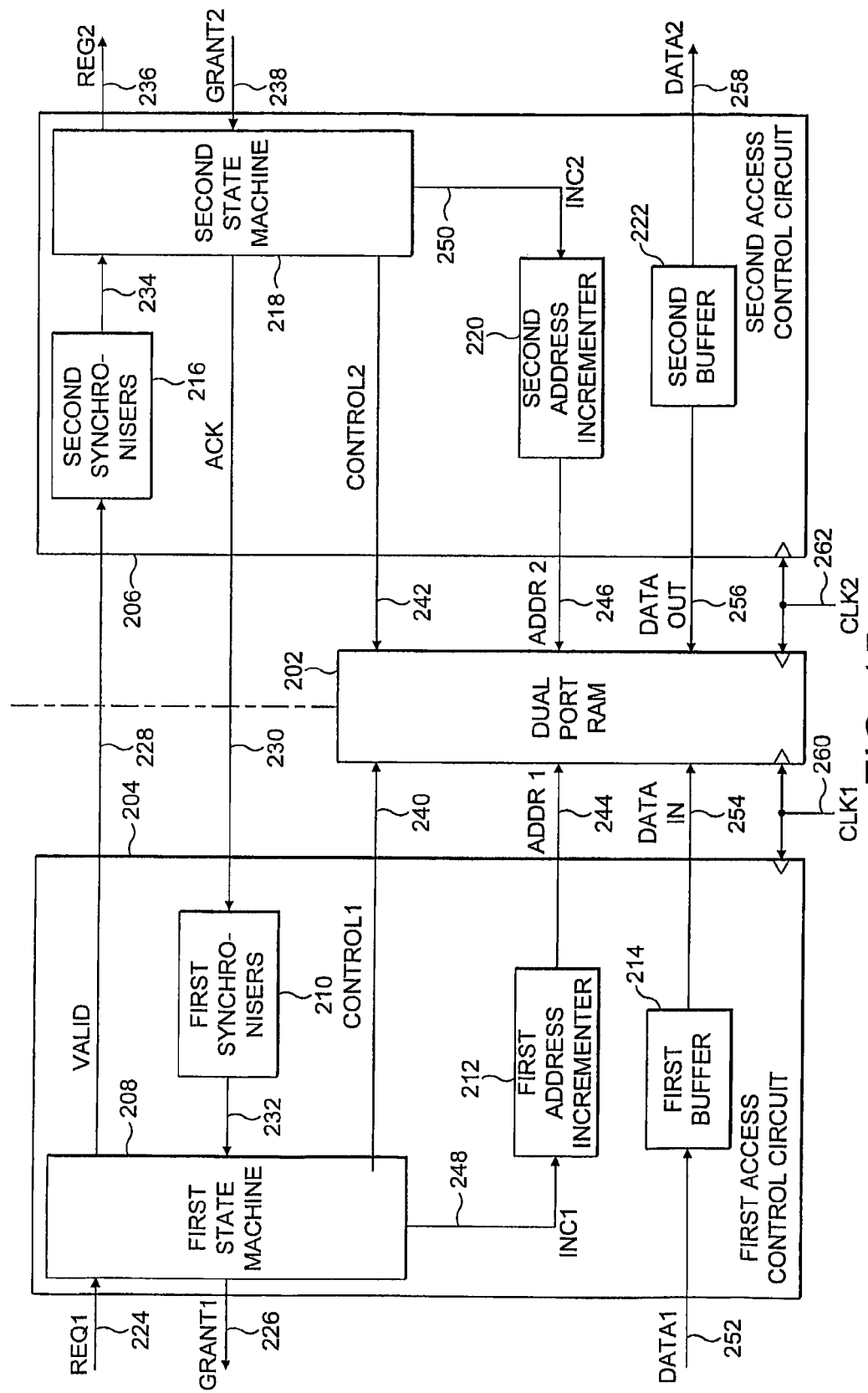
FIG. 15 shows a dual port buffer that can be implemented in embodiments of the present invention.

FIG. 15 shows dual port buffer circuitry that could be used between the PS decode blocks and the rest of the receive and transmit modules as shown in FIG. 11. The dual port buffer includes a dual port RAM 202, a first access control circuit 204 and a second access control circuit 206. The first access control circuit 204 comprises a first state machine 208, first synchronisers 210, a first address incrementer 212 and a first buffer 214. The second access control circuit 206 comprises second synchronisers 216, a second state machine 218, and a second address incrementer 220 and a second buffer 222. The first access control circuit 204 operates in the timing environment of the decode block, for example rx1 in FIG. 11. The clock 1 input on line 260 will be the clock derived from the pulse serial signal received from a transmit module. The decoded data from decode block 144 is received on line 252.

The input data, labelled DATA1 may pass through the optional buffer 214 for the purpose of boosting the electrical drive of the signal for retiming under the control of clock signal CLK1. The first buffer 214 outputs the data on line 254 and also receives from the decode block a control signal REQ1 on line 224 which the decode block outputs to indicate that there is valid data to be transferred to the second timing environment.

The signal REQ1 forms an input to the first state machine 208. In response to the signal REQ1, the first state machine 208 controls the transfer of the data DATA1 Into the dual port RAM 202. The first state machine 208 outputs a signal INC1 on line 248 to the first address incrementer 212, and the first address incrementer increments the address value ADDR1 on bus 44 to the dual port RAM. In this embodiment data to be transferred is stored in successive memory locations of the dual port RAM, such that for each block of data which is stored in the dual port RAM the first address incrementer 212 increments the storage address by one block. Thus, initially, the address to which the first address incrementer directs the data to be stored is an initial or base address. The first state machine 208 also outputs on bus 240 transmit control signals CONTROL1 to control the loading of the data into the selected address. Thus, under the control of the clock signal CLK1, the data DATAIN on bus 54 of the output of the first buffer is loaded into the dual port RAM at the selected address.

Once the data to be transferred has been successfully loaded into the dual port RAM, the first state machine 208 outputs a signal GRANT1 on line 226 back to the source, thereby indicating to the source that the source may begin to send a further block of data on the DATA1 bus 52. Furthermore, when sufficient data has been loaded into the dual port RAM 202, the first state machine 208 sends a signal VALID on line 28 across the clock boundary to the second access control circuit 206.

The signal VALID on line 228 is received by the second synchronisers 216 of the second access control circuit 206, and the synchronised output of the second synchronisers 16, being the signal VALID synchronised to the second clock signal CLK2, forms an input to the second state machine 218. In response to the synchronised signal VALID the second state machine 218 outputs control signals on the second control bus CONTROL2 242 to the dual port RAM 202, and outputs a signal INC2 on line 250 to the second address incrementer 220. This process is repeated according to how much data was transferred. Thus, the second state machine 218 controls the access of a data block stored in the dual port RAM at a location identified by the address ADDR2 on the address bus 46 output from the second address incrementer. As with the first address incrementer 212, in this-preferred embodiment the second address incrementer, in its initial state, retrieves data blocks from a base address, and thereafter from successive address locations. Thus, the second address incrementer follows the first address incrementer such that data is first retrieved from the block to which data has first been written, and so on through successive memory access cycles. Thus the data block which has been stored in the dual port RAM by the first access control circuit 204 is output as DATAOUT on the data bus 256 and stored in the second buffer 22 under the control of the clock signal CLK2 on line 262.

Once the data block has been successfully retrieved from the dual port RAM 202, the second state machine 218 sets a signal ACK on line 230 which is transferred to the first timing environment and the first access control circuit 204. The signal ACK is received by the first synchronisers 10, and the synchronised output thereof is input on line 232 to the first state machine 208. When the first state machine 208 receives the synchronised signal ACK on line 232 it indicates that there is further space in the dual port RAM for the first access control circuit to load data into.

The second state machine 218 also outputs a signal REQ2 on line 236 to a destination circuit which the data is to be transferred to in the second timing environment, when the data block has been successfully accessed from the dual port RAM 202. This signal indicates that valid data is available on the data bus 258 on the output of the second buffer 222. When the destination circuit receives the signal REQ2 it loads therein the data DATA2 on the bus 258 and once this is done returns a signal GRANT2 on line 238 to the second state machine 218, in response to which the second state machine 218 can, if further data blocks are available in the dual port RAM 202, access these data blocks and forward them to the destination circuit.

In the embodiment of FIG. 15, it is shown that the control protocol between the two timing environments is a single signal VALID in one direction from the first-timing environment to the second timing environment, and a single signal ACK in the other direction from the second timing environment to the first timing environment. However, the particular protocol that is used to control the flow of data across the timing boundary may vary considerably according to the desired application, the volume of flow of data, and the relative speeds of the two clocks of the respective timing environment. For instance, if the clock signal CLK2 in the second timing environment was much faster than the clock signal CLK1 in the first timing environment, then it is possible that the return signal of the protocol described with reference to FIG. 15, i.e. the signal ACK on line 230, could be dispensed with. However, to successfully operate such a system where there would be a single flow control signal in one direction only, i.e. the signal VALID on line 228, it would be necessary to know that the dual port buffer was going to be used in an environment where the two clocks had significantly different speeds.

If now the functions of the dual port buffer (DPBuff0) and decoder (PSDecode0) are merged (to become PSDecode2), and the extraction and Insertion of acknowledgement is moved until after the clock boundary crossing, then the communication of ack information between the transmitter (PSEncode0) and the transmit clocked side of the receiver (PSDecode2) can be achieved in a purely synchronous manner. This is shown in FIG. 12.

Figure 12:
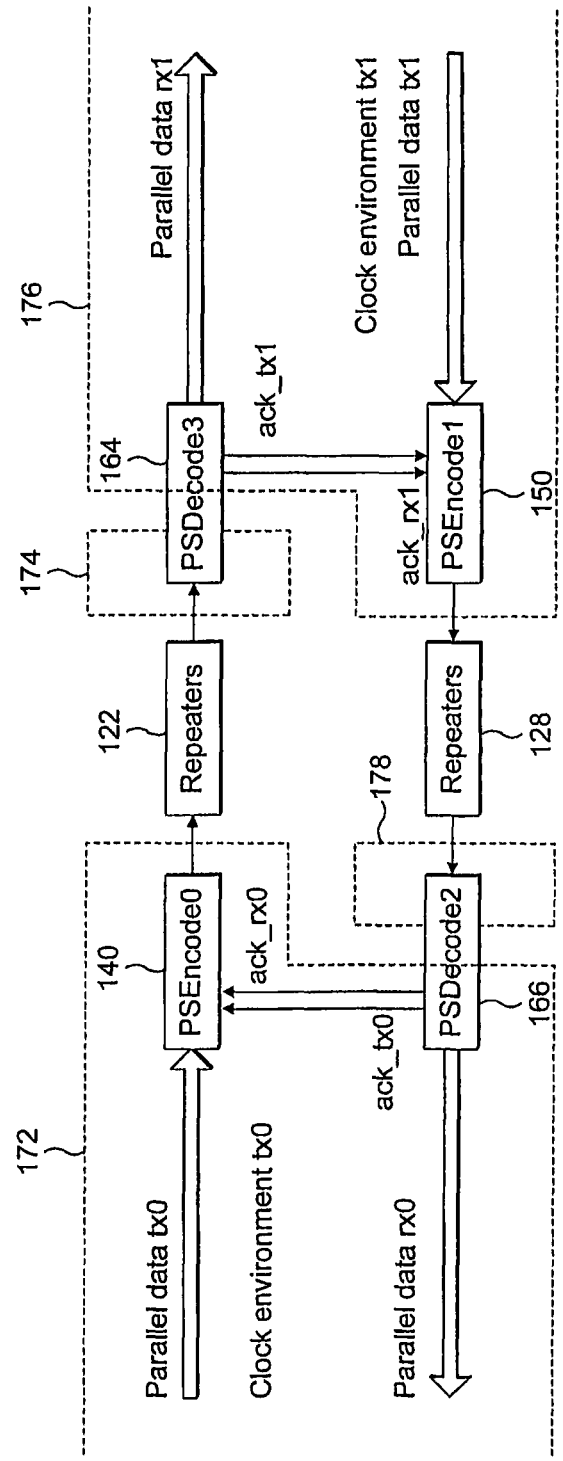
FIG. 12 shows a communications link according to another embodiment of the present invention.

FIG. 12 shows communication link circuitry in which the decode blocks are combined with dual port buffers, such that part of the decode block is clocked by the clock received from the serial link, and part of the decode block is clocked by the clock of the received module. This circuit is advantageous as transmitting the acknowledgement signal to the transmit module can be performed after the dual port buffer circuit, for example once data has been successfully received by the second access control circuit 206 of FIG. 15. In this arrangement, because the acknowledge signal is timed by the receive module which also times the encode block 150, the valid-ack handshake protocol is not required between the decode and encode blocks. This reduces the number of connections required between these block to just two.

Figure 13:
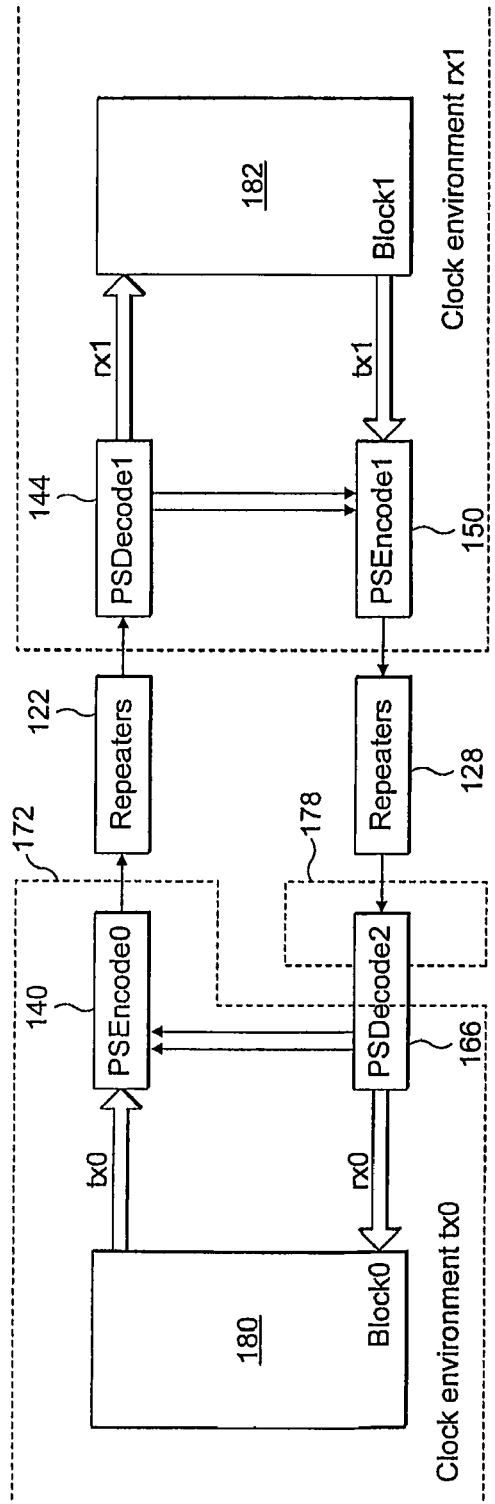
FIG. 13 shows a communications link according to another embodiment of the present invention.
Figure 14:
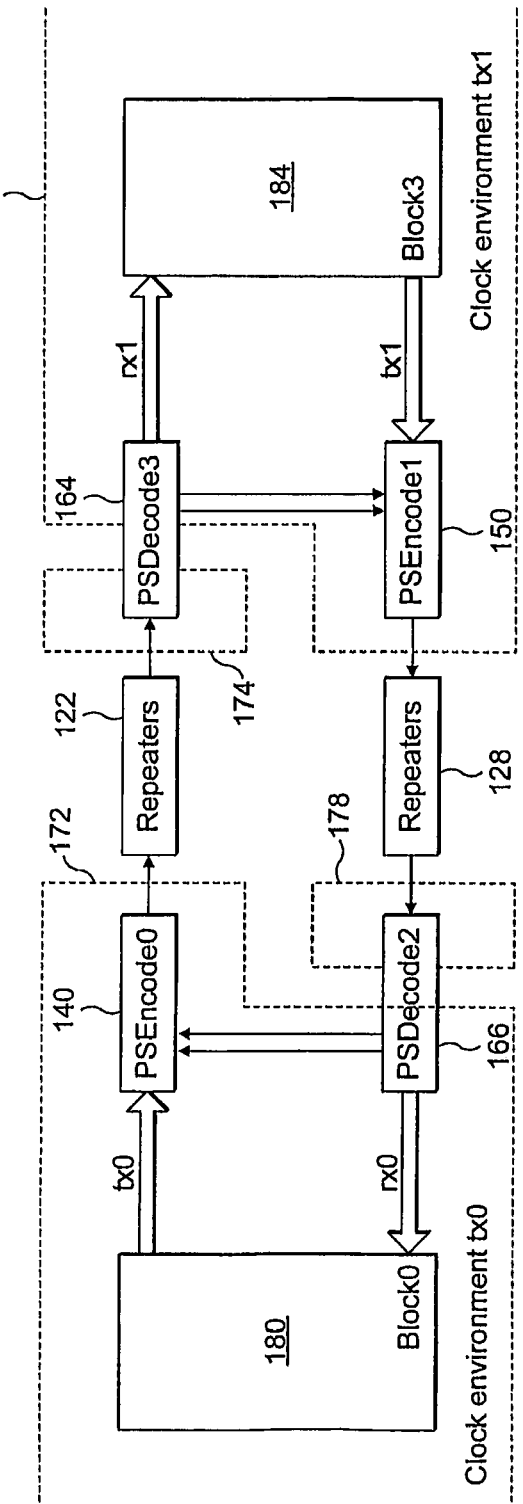
FIG. 14 shows a communications link according to another embodiment of the present invention.

FIGS. 13 and 14 show the logic blocks associated with the transmitting and receiving modules.

FIG. 13 shows a communication link in which the transmitting module comprises logic block 180, and a receive module comprises logic block 182. FIG. 13 shows the case in which logic block 182 is a relatively small logic block. In this case, the entire received module may be clocked by the clock received via the pulse serial link at the decode block 144. This is shown by clock environment rx1 in FIG. 13. The decode block 144 does not need to include the dual port buffer. The other encode and decode blocks and the repeaters in FIG. 13, which are numbered the same as FIG. 12 are identical to these blocks and will not be discussed in detail. The transmit circuitry is the same as shown in FIG. 12, however in this circuit the logic block1, labelled 182 in the received module is small, and can therefore be clocked by a buffered version of the clock extracted from the received pulse stream. All of the logic in this clock environment (clock environment rx1) is synchronous and there is no need for a clock boundary crossing dual port buffer in the receiver (PSDecode1).

Having synchronous decode and encode blocks in the receive module is advantageous because of the reduced amount of logic required in the receiver (PSDecode1). It also means that the arrangement is asymmetric in that receivers at either end of the link (PSDecode1, PSDecode2) are not the same, and this may not be so desirable.

Another problem arises if the given block is not small. For a larger block, a significant delay through clock tree is required to achieve a balanced clock tree to all end points with the block. So for practical purposes, the clock for the receiver must be considered a separate environment to the clock within the given block. This is shown in FIG. 14, in which the circuitry is identical to FIG. 12, however the logic block block3 184 replaces block1 182. Logic block 184 is large, and therefore an extensive clock tree will be required in order to transmit the clock to all parts of the logic block 184, resulting in significant delay between the clock received by the decode block 164. Decode block 164 will need to include dual port buffer circuitry in order to retime data.

Embodiments of the pulse serial communication link preferably use a coding scheme in order to encode data and acknowledgement signals onto the communication channel. This then implies that boundary crossing logic is incorporated into the receiver (PSDecode3). This arrangement is symmetrical.

Irrespective of which of the communication link circuits in FIGS. 8 to 14 is used, in order to prevent unnecessarily stalling the flow of information, both ends of the link need to be aware of how many data samples can be sent in advance of any acknowledgement. This depends on the size of the buffer in the receiver (PSDecode1). One possible scheme would be to allow up to three data samples to be send before the first ack is returned. Such a scheme requires prior knowledge of the size of buffer in the receiver.

As mentioned above, alternatively, the receiver could send a number of acknowledgement signals in advance of receiving any data samples. This has the advantage that it provides a means whereby the receiver can communicate how many data samples it is prepared to receive, and there does not have to be any prior arrangement.

It should be noted that running acknowledgements in advance or in arrears only determines the initial conditions. Once a link is in use, there has to be one acknowledgement corresponding to each data sample. Apart from the difference in initialization, the receiver logic for both schemes is the same, and, similarly, the transmitter logic for both schemes is the same.

In any of the bidirectional links described in relation to FIGS. 8 to 14, where the data flow bandwidth in one direction is not balanced by a corresponding data flow bandwidth in the other direction, the pulsed serial link can be used in both directions, however the number of selectable pulse widths in each direction can be different. For example, three widths could be used between the transmitting module to the receiving module, but only two widths could be used in the return path back to the transmitting module. The reduction in the number of widths in the return path will mean a reduction in the size of circuitry of the encoder and decoder required in the return path, and thus a cost saving.

At the lowest level of coding, data on a pulse serial link may be encoded using three pulse widths to carry each bit of data plus 1 bit to indicate data valid or request, as shown in table 1. Such a scheme was described above in relation to FIG. 2.

TABLE 1

| Pulse Width | Significance |
|---|---|
| A | Valid data bit, value = 0 |
| C | No valid data |
| E | Valid data bit, value = 1 |

Given that data is normally transferred in multiples of 8 bits, then during this eight bit transmission the significance of pulse width C is not in use, which is not efficient use of the bandwidth as the C position could be used to carry additional information. If there is a bidirectional link, the acknowledgement signal could be transmitted using the C pulse width. A coding scheme implementing this is shown in table 2 below.

TABLE 2

| Pulse Number | Significance of pulse width | | |
|---|---|---|---|
| | A | C | E |
| 0 | — | No data (repeat indefinitely) | — |
| 1 | Bit0 = 0 | — | Bit0 = 1 |
| 2 | Bit1 = 0 | Bit1 = 0 and ACK | Bit1 = 1 |
| 3 | Bit2 = 0 | Bit2 = 0 and ACK | Bit2 = 1 |
| 4 | Bit3 = 0 | Bit3 = 0 and ACK | Bit3 = 1 |
| 5 | Bit4 = 0 | Bit4 = 0 and ACK | Bit4 = 1 |
| 6 | Bit5 = 0 | Bit5 = 0 and ACK | Bit5 = 1 |
| 7 | Bit6 = 0 | Bit6 = 0 and ACK | Bit6 = 1 |
| 8 | Bit7 = 0 | Bit7 = 0 and ACK | Bit7 = 1 |

In this case, the acknowledgement signal is encoded using pulse width C, however in this coding scheme, if data bits 1 through 7 were all one, then the ACK cannot be sent. Furthermore, given that on average only one acknowledge signal will need to be send per 8-bit block, the C width will not be used to maximum potential.

More complex coding schemes that have better data transfer rates have a variety of modes in which acknowledgements, control data or data samples are sent. Such schemes will be described in detail herein below. All such coding schemes can be implemented using state machines or alternative circuitry for encoding and decoding the data, acknowledgement signals and control information, as is well known to those skilled in the art. Tables 3 and 4 below provide a key for understanding data in the following tables.

TABLE 3

| Key for following tables | |
|---|---|
| Item | Significance |
| Data Size Code | The binary code, transmitted LS (least significant) bit first (little endian), and represented with LS bit to the right. Or tertiary code (012) and other bases. (Tertiary code is shown in Table 4) It should be noted that all codes "start" with a 1 (or appropriate non-idle code), corresponding to a start bit, to distinguish between successive 0's (repeated idle codes) when idle. |
| Data Sample Size | The number of bits following the data size code. |
| TT | A pair of tertiary bits, with all 8 values, except for the 9th value (22 reserved for idle). Notice that these 8 values correspond to 3 binary bits. |

The columns in table 4 show 3 bit binary code, with the tertiary and decimal equivalent.

TABLE 4

| Tertiary Binary Mapping | | |
|---|---|---|
| Binary | Tertiary | Decimal |
| 000 | 00 | 0 |
| 001 | 01 | 1 |
| 010 | 02 | 2 |
| 011 | 10 | 3 |
| 100 | 11 | 4 |
| 101 | 12 | 5 |
| 110 | 20 | 6 |
| 111 | 21 | 7 |
| — | 22 | Idle |
| — | TT | Any non-idle value |

Embodiments of the pulse serial link implemented with just two widths, A and E for example, preferably use the following encoding scheme detailed in Table 5.

TABLE 5

| Data Size Code | Data Sample Size | Significance |
|---|---|---|
| 0 | 0 | Idle. Repeated indefinitely. Applies only after last bit of data is transmitted. Optional (data size code and data sample can be back to back without any intervening idle). |
| 001 | 0 | Ack. Not considered as a data sample. An acknowledge is required in response to each data sample. |
| 101 | 8 | Control Byte. Not considered as a data sample. No corresponding ack is required. Used, for example, to negotiate link characteristics: the number of widths, the size of the receive buffer. The control byte is not passed through to subsequent logic. |
| 011 | 8 | 8-bit Data Sample or Data Byte. Data passes through unaltered. |
| 0111 | 32 | 32-bit Data Sample, Data Word or Address Word. |
| Other | | Or other negotiated size. |

According to this scheme, pulse width A represents logic '0', and pulse width E represents logic '1'. The repeated transmission of pulse width A will indicate an idle state in which no data is transmitted. Transmission of pulse width E followed by pulse width A twice will indicate an acknowledgement. Transmission of pulse width E, followed by A, followed by E, will indicate that the next eight pulses will contain a control byte. Transmission of pulse width E twice followed by A will indicate that an 8-bit data sample will follow in the next eight pulses, and transmission of pulse width E three times followed by pulse width A will indicate that a 32 bit data sample will follow.

Without a null data width C, it is necessary to define code that indicates when data is and is not valid. In this example a sequence of zeros indicates an idle state in which data is not transmitted. As shown in the table, the code '001' is used as an acknowledgment signal. As explained in table 3, the data size code is first transmitted, least significant bit first, followed by the associated data. In the case of the acknowledgment signal there is no data.

A control byte defines certain characteristics of the link, such as the number of pulse widths, and the size of the receive buffer for receiving data.

Efficiency of this two width coding scheme when used to transmit blocks of 32 bits can be determined as follows:

Bandwidth efficiency (full duplex)=32(data)/3(ack)+4(code)+32(data)=82%.

Better efficiency can be achieved if the number of pulse widths is increased. A simple scheme using three pulse widths is shown in Table 6 below.

TABLE 6

| Data Size Code | Data Sample Size | Significance |
|---|---|---|
| 2 | 0 | Idle. Repeated indefinitely. Applies only after last bit of data is transmitted. |

TABLE 6-continued

| Data Size Code | Data Sample Size | Significance |
|---|---|---|
|  |  | Optional (data size code and data sample can be back to back without any intervening idle). |
| 1 | 0 | Ack. Not considered as a data sample. An acknowledge is required in response to each data sample. |
| 20 | 8 | Control Byte. Not considered as a data sample. No corresponding ack is required. Used, for example, to negotiate link characteristics: the number of widths, the size of the receive buffer, ack requirements. The control byte may not be passed through to subsequent logic. Notice that this is a longer encoding on the assumption that control bytes are rare. |
| 10 | 8 | 8-bit Data Sample. Data passes through unaltered. |
| 00 | n | n-bit Data Sample. Data passes through unaltered. |

This coding scheme has the benefits of being simple; requiring little logic to encode and decode. In this scheme, pulse width A represents tertiary logic '0', pulse width C represents tertiary logic '1', and pulse width E represents tertiary logic '2'. In terms of useful bits per clock period, it is quite efficient (91%) because the third level is used to carry idle/ack/control information; but it is not so efficient in overall use of bandwidth because the third level is unused for the bulk of the data transmission.

Efficiency of this link can be determined as follows:

Bits per clock efficiency (full duplex)=32(data)/1 (ack)+2(code)+32(data)=91%.

Bandwidth efficiency (full duplex)=91(bits per clock efficiency)/150(bandwidth)=61%.

A more complex scheme using three selectable pulse widths is shown in table 7. This scheme attempts to make best use of the tertiary encoding possible with three levels. However, this implies significantly more logic to encode and decode. Solutions that use a binary multiple of levels require less logic.

Again in this scheme the three selectable pulse widths are widths A, C and E, which are represented in the table as tertiary logic values 0, 1 and 2 respectively. Pulses are sent in pairs, giving a total of nine possible values. In alternative schemes single pulses could be sent, a '2' being used for idle and to determine whether data or other information is being sent, however this would mean that only two pulse widths, '0' and '1' would be left for data which would not use the bandwidth as efficiently.

When the third pulse width, logic '2', is transmitted twice in the pair, this indicates an idle state. When data is transmitted, a 9-bit data sample will be transmitted, with the first bit carrying an embedded acknowledgment signal. When a control byte is transmitted, the first bit may also carry an embedded acknowledgement. As shown in table 4 above, in order to encode 3-bits of data into two tertiary values, the logic value '22' need never be used, and therefore this can be reserved for the idle state. 'TT' in the table indicates two pulses of tertiary logic in which any value other than '22' is transmitted.

As can be seen from the table, in the case of an isolated acknowledgement, a control byte or sample data, the significance of the first pair of pulses transmitted cannot be determined until the subsequent pulse is received. For example, transmission of '21' could indicate an isolated acknowledgement, the start of a control byte or the start of a data sample, but when the subsequence pair of pulses is '22', this indicates that it is an isolated acknowledgement. If the subsequent pair of pulses is 'TT' (anything other than '22'), this would however indicate that the transmission is a control byte or a data sample, and the third pair of pulses would need to be received in order to determine which it is. If the third pair is '22', this would indicate a control byte, and the following pair of pulses would give the final values of the byte. If the third pair is 'TT', this would indicate that the transmission is a data sample, which can have an embedded acknowledgement.

TABLE 7

| Data Size Code | Data Sample Size | Significance |
|---|---|---|
| 22 | 0 | Idle. Repeated indefinitely. Applies only after last bit of data is transmitted. Optional (data size code and data sample can be back to back without any intervening idle). |
| (22)21 | 0 | Isolated Ack with no data. Not considered as a data sample. An acknowledge is required in response to each data sample. |
| TT 22 TT TT | (8) | Control Byte. Not considered as a data sample. No corresponding ack is required. Used, for example, to negotiate link characteristics: the number of widths, the size of the receive buffer, ack requirements. The control byte may not be passed through to subsequent logic. Notice that this is a longer encoding on the assumption that control bytes are rare. Notice that the positioning of the 22 pair as the third pair distinguishes this from the other data size codes. |
| TT TT TT | (8) | 9-bit Data Sample with 1st bit carrying embedded Ack. Data passes through unaltered. Notice that predetermining the number of bytes is not so important because (according to the particular scheme used) a subsequent idle can be used to indicate end of data. |

Efficiency of the scheme shown in FIG. 7 can be determined as follows:

Bits per clock efficiency (full duplex)=8(data)/6(tertiary bit periods)=133%.

Bandwidth efficiency (full duplex)=133(bits per clock efficiency)/150(bandwidth)=88%.

Table 8 shows an example of a coding scheme that uses four selectable pulse widths, for example A, B, D and E in the pulse serial link example discussed herein above. For example, A represents binary '00', B represents binary '01', D represents binary '10' and E represents binary '11'. This is similar to the example shown in FIG. 2A, except that no null data pulse width is required because of the encoding scheme used.

This scheme makes efficient use of the bandwidth and is relatively simple. If the number of bits per data sample (n) is 32, then this implies a storage requirement of 64 bits at any store and forward node. However, if n is 8, then the storage requirement drops to 16 bits, with a corresponding reduction in bandwidth efficiency.

TABLE 8

| Data Size Code | Data Sample Size | Significance |
|---|---|---|
| 00 | 0 | Idle.<br>Repeated indefinitely.<br>Applies only after last bit of data is transmitted.<br>Optional (data size code and data sample can be back to back without any intervening idle). |
| (00) 01 | 0 | Isolated Ack.<br>Not considered as a data sample.<br>An acknowledge is required in response to each data sample. |
| 1A 01 | 8 | Control Byte with embedded Ack.<br>Not considered as a data sample.<br>No corresponding ack is required.<br>Used, for example, to negotiate link characteristics: the number of widths, the size of the receive buffer, ack requirements.<br>The control byte may not be passed through to subsequent logic.<br>Notice that this is a longer encoding on the assumption that control bytes are rare. |
| 01 01 | — | Reserved for future use. |
| 1A | n | n-bit Data Sample with embedded Ack.<br>Data passes through unaltered. |

In this scheme, repeated transmission of pulse width A (00 in the table) indicates an idle state. If pulse width B is transmitted (01), this indicates that another pulse width is required in order to determine the state that should be entered. Following pulse width B with pulse A (00) indicates an isolated acknowledgment signal. Following pulse width B with pulse width D (10) or pulse width E (11) indicates that the following four pulses will represent 8 bits of control data, however, if pulse width D is used, no acknowledgement is transmitted, and if pulsewidth E is used, this indicates that an acknowledgement is transmitted.

If the first pulse is width D (10), this indicates that an n-bit data sample will follow, and the value or 'n' may be predetermined for a given system, or programmed using the control byte.

If the first pulse is of width E (11), this not only indicates that n bits of data will follow, but also an acknowledge signal.

If n is 32, the four bit scheme will have an efficiency as follows:

Bits per clock efficiency (full duplex)=32(data)/1 (code)+16(double bit periods)=188%.

Bandwidth efficiency (full duplex)=188(bits per clock efficiency)/200(bandwidth)=94%.

If n is 8, then the scheme will have the following efficiency:

Bits per clock efficiency (full duplex)=8(data)/1 (code)+4(double bit periods)=160%.

Bandwidth efficiency (full duplex)=160(bits per clock efficiency)/200(bandwidth)=80%.

It should be noted that in all of the above schemes, the control byte does not require an acknowledgement to indicate that this has been received. This is because the control byte is not considered a data sample, and will not be treated as data and forwarded on the parallel data connection to the logic on the receive or transmit module. The control byte is part of the flow control protocol, and will not itself affect the flow of data, and therefore no acknowledge is required.

The application hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. An apparatus configured to transmit a clock and data from a first module to a second module connected by a single outward line and a single return line, the apparatus comprising:
a transmitter configured to transmit a data pulse on the single outward line, the transmitter comprising:
a first circuit configured to assert a first edge of the data pulse on the single outward line, the first edge representing a timing edge of the clock; and
a second circuit configured to assert a second edge of the data pulse on the single outward line a selectable time period after the first edge, the selectable time period representing the data, the data pulse void of any additional edge between the first edge and the second edge of the data pulse; and
a receiver configured to receive a return pulse on the single return line, the receiver comprising:
a third circuit configured to receive and detect a first edge and a second edge of the return pulse, the first and second edges being separated by a first time period, the first time period representing an acknowledgement.

2. The apparatus according to claim 1, wherein the acknowledgement indicates that the data pulse has been received by the second module.

3. The apparatus according to claim 1, wherein the acknowledgement indicates that a group of the data pulses has been received by the second module.

4. The apparatus according to claim 1, wherein in response to the acknowledgement the first module is configured to transmit a data pulse on the outward line to the second module.

5. The apparatus according to claim 1, wherein the acknowledgement indicates that an input buffer in the second module can receive more data.

6. The apparatus according to claim 1, wherein the first and second modules are on the same integrated circuit.

7. An apparatus configured to transmit first data and a clock from a first module to a second module on a first single line, and to transmit second data from the second module to the first module on a second single line, the first module comprising:
a transmitter configured to transmit a first pulse on the first single line comprising:
a first circuit configured to assert a first edge of the first pulse on the first single line, the first edge representing a timing edge for the clock; and
a second circuit configured to assert a second edge of the first pulse on the first single line at one of a plurality of selectable time periods after the first edge of the first pulse, the selectable time period representing the first data, the first pulse void of any additional edge between the first edge and the second edge of the first pulse;
the second module comprising:
a transmitting circuit configured to transmit a second pulse on the second single line comprising:
a third circuit configured to assert a first edge of the second pulse on the second single line; and a fourth circuit configured to assert a second edge of the second pulse on the second single line at one of a plurality of selectable time periods after the first edge of the second pulse, the selectable time period representing the second data wherein the number of selectable time periods for the second edge of the first pulse on the first single line does not equal the number of selectable time periods for the second edge of the second pulse on the second single line.

8. A method of encoding a clock data and an acknowledgement signal onto a single line from a second module to a first module, the method comprising:
 asserting a first edge of a pulse on the single line, the first edge of the pulse representing a timing edge for the clock; and
 asserting a second edge of the pulse on the single line at one of at least three selectable time periods after the first edge of the pulse, a first and a second of the selectable time periods representing respectively different data values and a third selectable time period representing a data value and an embedded acknowledgement, the pulse void of an additional edge between the first edge and the second edge of the pulse.

9. The method according to claim 8, wherein the embedded acknowledgement indicates that at least one data value has been received by the second module from the first module.

10. The method according to claim 8, wherein the embedded acknowledgement indicates that the second module is ready to receive data from the first module.

11. The method according to claim 8, wherein the data value represented by the first selectable time period is the same value as the data value represented by the third selectable time period.

12. The method according to claim 8, wherein a fourth selectable time period represents a different data value and an acknowledgement.

13. The method according to claim 8, wherein a further selectable time period represents an idle state in which no data and no acknowledgement is communicated.

14. A method of communicating between two modules on a single line, the method comprising:
 transmitting a first pulse on the single line comprising:
  asserting a first edge of the first pulse on the single line, the first edge of the first pulse representing a timing edge for the clock; and
  asserting a second edge of the first pulse on the single line at one of a plurality of selectable time periods after the first edge of the pulse, a first selectable time period representing a flow control value for controlling the flow of data between the modules, the first pulse void of any additional edge between the first edge and the second edge of the first pulse.

15. The method according to claim 14, wherein a second selectable time period indicates that a subsequent pulse transmitted on the single line represents data.

16. The method according to claim 14, wherein a third selectable time period represents an idle state in which no data and no acknowledgement is communicated.

17. A method of conveying a clock and information between two modules on a single line, the method comprising:
 transmitting a first pulse and a subsequent pulse on the line, each pulse having a pulse width and being transmitted by asserting a first edge of the first pulse, the first edge of the first pulse representing a timing edge for the clock and a second edge of the first pulse on the single line separated by a selectable time period thereby providing a plurality of different pulse widths,
 wherein the significance of the pulse width used for the first pulse depends on the pulse width of the subsequent pulse, and
 wherein the data pulse is void of any additional edge between the first edge and the second edge of the data pulse.

18. The method according to claim 17, wherein the significance of the pulse width of the first pulse and the subsequent pulse further depends on the pulse width of a further subsequent pulse.

19. The method according to claim 17, further comprising transmitting a pair of first pulses and a pair of subsequent pulses.

20. The method according to claim 17, wherein the significance of the pulse width of the first pulse width is at least one of an acknowledgement, control data, and a data sample.

21. The method according to claim 17, wherein the significance of the first pulse is determined by whether or not the subsequent pulse represents an idle state.

* * * * *